US012106620B2

(12) United States Patent
Poddar

(10) Patent No.: US 12,106,620 B2
(45) Date of Patent: Oct. 1, 2024

(54) LOCKING MEDICATION CONTAINERS AND METHODS OF USE THEREOF

(71) Applicant: Satish Poddar, Duluth, GA (US)

(72) Inventor: Satish Poddar, Duluth, GA (US)

( * ) Notice: Subject to any disclaimer, the term of this patent is extended or adjusted under 35 U.S.C. 154(b) by 0 days.

(21) Appl. No.: 17/523,408

(22) Filed: Nov. 10, 2021

(65) Prior Publication Data

US 2022/0245981 A1 Aug. 4, 2022

Related U.S. Application Data

(63) Continuation of application No. 16/895,868, filed on Jun. 8, 2020, now Pat. No. 11,176,764, which is a continuation-in-part of application No. 16/431,449, filed on Jun. 4, 2019, now abandoned, which is a continuation of application No. 16/053,027, filed on Aug. 2, 2018, now Pat. No. 10,325,433, which is a continuation of application No. 15/399,106, filed on Jan. 5, 2017, now Pat. No. 10,064,788.

(51) Int. Cl.

| | |
|---|---|
| ***G07C 9/00*** | (2020.01) |
| ***A61J 1/03*** | (2023.01) |
| ***A61J 7/00*** | (2006.01) |
| ***A61J 7/04*** | (2006.01) |
| ***G06Q 50/14*** | (2012.01) |

(52) U.S. Cl.
CPC ............ *G07C 9/00896* (2013.01); *A61J 1/03* (2013.01); *A61J 7/0084* (2013.01); *A61J 7/0409* (2013.01); *A61J 7/0445* (2015.05); *A61J 7/0481* (2013.01); *G06Q 50/14* (2013.01); *A61J 2200/30* (2013.01)

(58) Field of Classification Search
CPC ....... G07C 9/00896; A61J 1/03; A61J 7/0084; A61J 7/0445; A61J 2200/30
See application file for complete search history.

(56) References Cited

U.S. PATENT DOCUMENTS 5,701,828 A 12/1997 Benore et al.
7,467,093 B1 12/2008 Newton et al.
(Continued)

OTHER PUBLICATIONS

J. Russell et al. "Illinois Law Will Bring Lockable Pill Bottles, But Will They Work?", Chicago Tribune, Sep. 2, 2015, pp. 1-3, http://www.chicagotribune.com/business/ct-locked-pill-bottles-0903-biz--2--0150902-story.html.
(Continued)

*Primary Examiner* — Vernal U Brown
(74) *Attorney, Agent, or Firm* — BakerHostetler

(57) ABSTRACT

A medication container system and method of use thereof that may be locked using a locking mechanism. A request from a user is received by a medication provider for a medication and placed in a medication container with a locking mechanism that is operable to lock and unlock the medication container. The medication container is locked using the locking mechanism. The locked medication container with the medication within is provided to the user. Subsequent to providing the locked medication container to the user, a request is received from the user to access the medication in the medication container. A credential is sent to the user that is usable, via the locking mechanism, to unlock the medication container. The user may then input the credential into the locking mechanism to unlock the medication container and access the medication therein.

16 Claims, 23 Drawing Sheets

(56) References Cited

U.S. PATENT DOCUMENTS

| | | | | |
|---|---|---|---|---|
| 7,600,648 | B2 | 10/2009 | Hamer | |
| 8,020,415 | B2 | 9/2011 | Corbin et al. | |
| 8,662,330 | B2 | 3/2014 | Simpson | |
| 8,944,263 | B1 | 2/2015 | Small | |
| 9,870,450 | B2 | 1/2018 | Blackburn | |
| 10,064,788 | B2 | 9/2018 | Poddar | |
| 10,325,433 | B2 | 6/2019 | Poddar | |
| 10,512,592 | B1 | 12/2019 | Sandhu | |
| 11,176,764 | B2 * | 11/2021 | Poddar | G06Q 50/14 |
| 2008/0029601 | A1 | 2/2008 | Clarke et al. | |
| 2010/0318218 | A1 | 12/2010 | Muncy, Jr. et al. | |
| 2012/0185276 | A1 | 7/2012 | Shah | |
| 2015/0272825 | A1 | 10/2015 | Lim et al. | |
| 2015/0327691 | A1 | 11/2015 | Alshammari | |
| 2016/0158107 | A1 * | 6/2016 | Dvorak | A61J 7/0084 221/9 |
| 2017/0053098 | A1 | 2/2017 | Hawkins | |
| 2017/0270274 | A1 * | 9/2017 | García | A61J 7/0481 |

OTHER PUBLICATIONS

D. Lambert, "Locking Pill Bottles Gaining in Marketplace," The Sacramento Bee, Jan. 10, 2015, pp. 1-3, http://www.sacbee.com/news/business/technology/article5730735.html.

Safe Lock—Combination Locking Medication Bottle, pp. 1-2, http://www.saferlockrx.com/product/safer-lock/. Accessed Feb. 2020.

* cited by examiner

LOCKING MEDICATION CONTAINERS AND METHODS OF USE THEREOF

CROSS REFERENCE TO RELATED APPLICATIONS

This application is a continuation of U.S. patent application Ser. No. 16/895,868 filed on Jun. 8, 2020, which is a continuation-in-part of U.S. patent application Ser. No. 16/431,449 filed Jun. 4, 2019, which is a continuation of U.S. patent application Ser. No. 16/053,027 filed Aug. 2, 2018, now U.S. Pat. No. 10,325,433 issued Jun. 18, 2019, which is a continuation of, and claims priority to U.S. patent application Ser. No. 15/399,106, filed Jan. 5, 2017, now U.S. Pat. No. 10,064,788 issued Sep. 4, 2018, all of which are entitled "Locking Medication Containers and Methods of Use Thereof," the entire contents of which are hereby incorporated herein by reference.

TECHNICAL FIELD

The technical field relates generally to medication containers and more particularly to systems and methods for utilizing locking medication containers.

BACKGROUND

Many people enjoy travelling to other parts of the world to see new sights and enjoy the local culture. Similarly, the modern business world requires many worke098714rs to travel abroad to investigate a potential new market or meet a foreign client, for example. Visiting a new locale, however, may expose a traveler to novel circumstances or environments which may adversely affect the traveler's health. For instance, the water purification technology used at a travel destination may be less advanced than that of a traveler's home city. When the traveler drinks the water at the travel destination, the traveler may be exposed to bacteria, parasites, or other pathogens that the traveler's immune system is unaccustomed to handling. As another example, certain diseases, such as malaria, may be common in some regions of the world. When a traveler visits one of those regions, the traveler may be exposed to those diseases to which the traveler might not have otherwise been exposed. It is not uncommon for a particular travel destination to be associated with several such factors that may each adversely affect a traveler's health. Moreover, even ailments common in a traveler's home country may strike when at a travel destination.

In order to allow a traveler to respond while on the trip to such adverse health conditions caused by various aspects of a travel destination, a health care provider may supply a medication for each of the potential health conditions.

SUMMARY

Disclosed herein are locking medication containers and methods of use thereof. In one aspect, a method may include receiving, by a medication provider and from a user, a request for a medication. The medication may be placed in a medication container with a locking mechanism that is operable to lock and unlock the medication container. The medication container may be locked using the locking mechanism. The locked medication container with the medication within may be provided to the user. Subsequent to providing the locked medication container to the user, a request may be received from the user to access the medication in the medication container. A credential may be sent to the user that is usable, via the locking mechanism, to unlock the medication container. The user may then input the credential into the locking mechanism to unlock the medication container and access the medication therein.

In another aspect, a method may include receiving, by a medication provider, a request from a user for medication. The medication may be placed in a plurality of compartments in a medication container that is configured with a locking mechanism that is operable to lock and unlock each of the plurality of compartments. Each of the plurality of compartments may be locked using the locking mechanism. The locked medication container may be provided to the user. A request may subsequently be received from the user requesting access to the medication in the medication container. A credential may be sent to the user that is usable, via the locking mechanism, to unlock a subset of the plurality of compartments. The user may use the credential with the locking mechanism to unlock the subset of the plurality of compartments and access the medication therein.

In yet another aspect, a medication container may include a plurality of compartments, each for holding a medication. The medication container may further include a locking mechanism operable to lock and unlock each of the plurality of compartments. The medication container may further include a display and a processor communicatively connected to the locking mechanism and the display. The medication container may include a memory, communicatively connected to the processor and having instruction that, when executed by the processor, cause the processor to effectuate operations. The operations may include receiving an indication of a time interval during which a credential may be usable via the locking mechanism to unlock a subset of the plurality of compartments. The operations may further include displaying an indication, on the display and during the time interval, that a user should provide a user input. For example, the indication that a user should provide the user input may comprise an indication of the credential, such as a code. The operations may yet further include receiving the user input at a time point and, upon a determination that the user input matches the credential and that the time point is within the time interval, causing the locking mechanism to unlock the subset of the plurality of compartments.

BRIEF DESCRIPTION OF THE DRAWINGS

The following detailed description is better understood when read in conjunction with the appended drawings. For the purposes of illustration, examples are shown in the drawings; however, the subject matter is not limited to the specific elements and instrumentalities disclosed. In the drawings.

DETAILED DESCRIPTION OF ILLUSTRATIVE EMBODIMENTS

Described herein are locking medication containers and methods of using said locking medication containers. The container may be provided by a medication provider, such as a pharmacist, physician, or even an automated medication dispenser. The container may contain one or more medications or other medical products. One or more of the medications or other medical products included in the container may be determined by the health care provider according to a travel destination or the type of medication provided. For example, if the medication is highly addictive and subject to abuse, the medicine may be locked inside the container and the container may contain only the prescribed dosage. The medication container may be unlocked by the patient only after approval from the pharmacist or physician. For example, the pharmacist or physician may provide a credential or other form of instruction to the patient that allows the patient to unlock the container and thereby gain access to the medication therein.

In describing embodiments of the present disclosure illustrated in the figures, specific terminology is employed for the sake of clarity. The disclosure, however, is not intended to be limited to the specific terminology so selected, and it is to be understood that each specific element includes all technical equivalents that operate in a similar manner to accomplish a similar purpose.

Figure 1A:
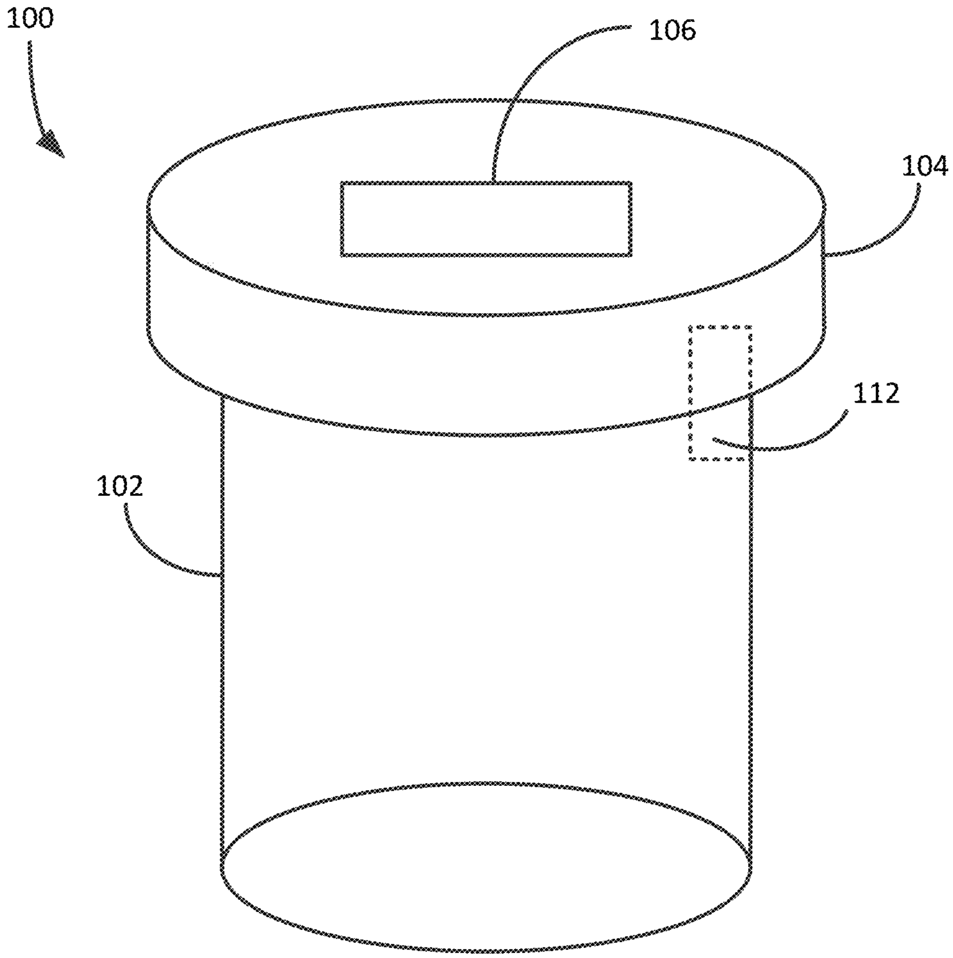
FIG. 1A is an example illustration of a medication container according to an embodiment of the present disclosure.

FIG. 1A illustrates an exemplary embodiment of medication container 100. Medication container 100 may include housing 102, lockable cap 104, locking mechanism 106, and destruction mechanism 112. Housing 102 may be any housing, such as a container, that can hold and store medication. Lockable cap 104 may be operably attached to housing 102 to secure the medication stored therein. Lockable cap 104 may be configured to lock onto housing 102 via locking mechanism 106. Locking mechanism 106 may secure lockable cap 104 to housing 102, and it may include various means for unlocking lockable cap 104. For example, locking mechanism 106 may include an input via which a patient or other user may enter a credential to unlock locking mechanism 106 and thus also lockable cap 104. As used herein, a credential may include a code, password, passphrase, gesture, or other means of authentication with locking mechanism 106 or other locking mechanisms described herein. Further, in contexts described herein in which the credential is not required to be communicated between parties, a credential may also refer to a biometric identifier.

Medication container 100 may be made of a type of material that is lightweight, but durable. Medication container 100 may need to be light enough to carry, but durable enough so that it would be extremely difficult to break. For example, medication container 100 may be made of carbon fiber, a metal such as aluminum, a hard plastic such as PVC, and the like.

Medication container 100 may include destruction mechanism 112. In an aspect, destruction mechanism 112 may be affixed to lockable cap 104. Destruction mechanism 112 may be a mechanism that can be configured to destroy or otherwise render unusable any medicine stored in housing 102. For example, destruction mechanism 112 may house a liquid, such as a spoiling agent, that, when destruction mechanism 112 is activated, may be released into housing 102 to destroy or render medication disposed within unusable. Destruction mechanism 112 may prevent medication housed inside housing 102 from being accessed without locking mechanism 106 being properly unlocked. For example, destruction mechanism 112 may be activated upon a determination that one or more unauthorized attempts have been made to access the medicine contained within medication container 100 or that medication container 100 has otherwise been tampered with. For example, destruction mechanism 112 may be activated upon a determination that an incorrect credential has been entered into locking mechanism 106 a number of times equal to or greater than a predetermined threshold. Destruction mechanism 112 may, in some aspects, be mechanically activated by an improper access attempt. For example, the body of medication container 100 may be configured with destruction mechanism 112 such that if there is a breach or other trauma to the body, destruction mechanism 112 would activate.

Figure 1B:
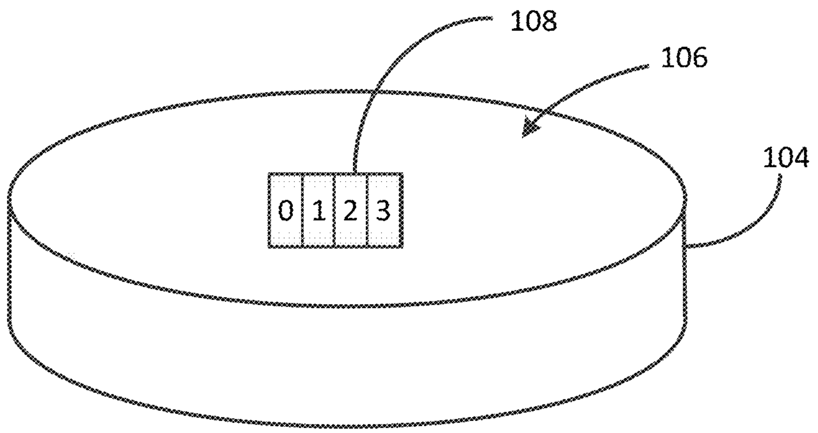
FIG. 1B is an example illustration of a cap of a medication container shown with a locking mechanism according to an embodiment of the present disclosure.
Figure 1C:
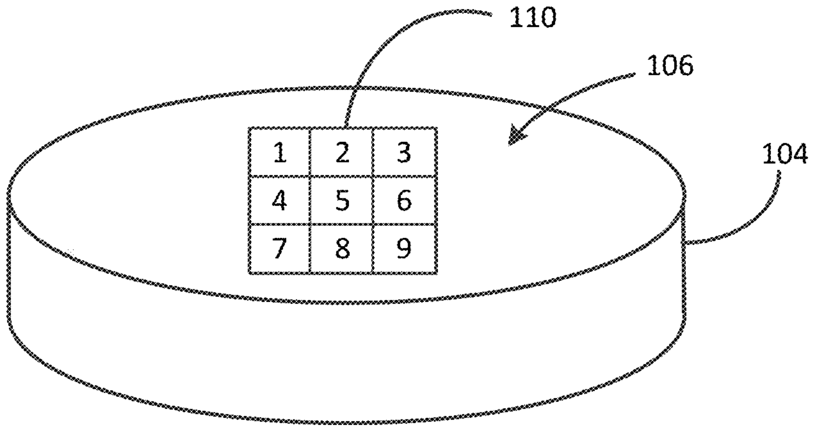
FIG. 1C is an example illustration of a cap of a medication container shown with a locking mechanism according to an embodiment of the present disclosure.

FIGS. 1B-1C illustrate various types of locking mechanism 106 that may be used within the scope of the invention. In FIG. 1B, locking mechanism 106 includes one or more numbered dials 108 that, when the right combination of numbers is selected, will unlock lockable cap 104, similar to a rotary dial lock. In FIG. 1C, locking mechanism 106 includes a series of alphanumeric buttons 110 that, when pressed in the right combination or order, unlock lockable cap 104. In an aspect, locking mechanism 106 may be a mechanical locking mechanism. That is, the mechanism (e.g., numbered dials or buttons) used to input the credential may be purely mechanical, as may be the particular mechanism that locks and unlocks lockable cap 104 to housing 102. In another aspect, locking mechanism 106 may also incorporate electronic components to, for example, receive an input of a credential from a user, evaluate the input credential against a predetermined credential (i.e., the correct credential to unlock locking mechanism 106), and/or effectuate unlocking locking mechanism 106 if the input credential is correct. It yet another aspect, locking mechanism 106 may comprise a biometric lock in which a biometric identifier, such as a fingerprint or voice sample, is provided to unlock locking mechanism 106. It can be appreciated that there are numerous other types of locking mechanisms that can be used to lock or unlock lockable cap 104 to or from housing 102.

Figure 1D:
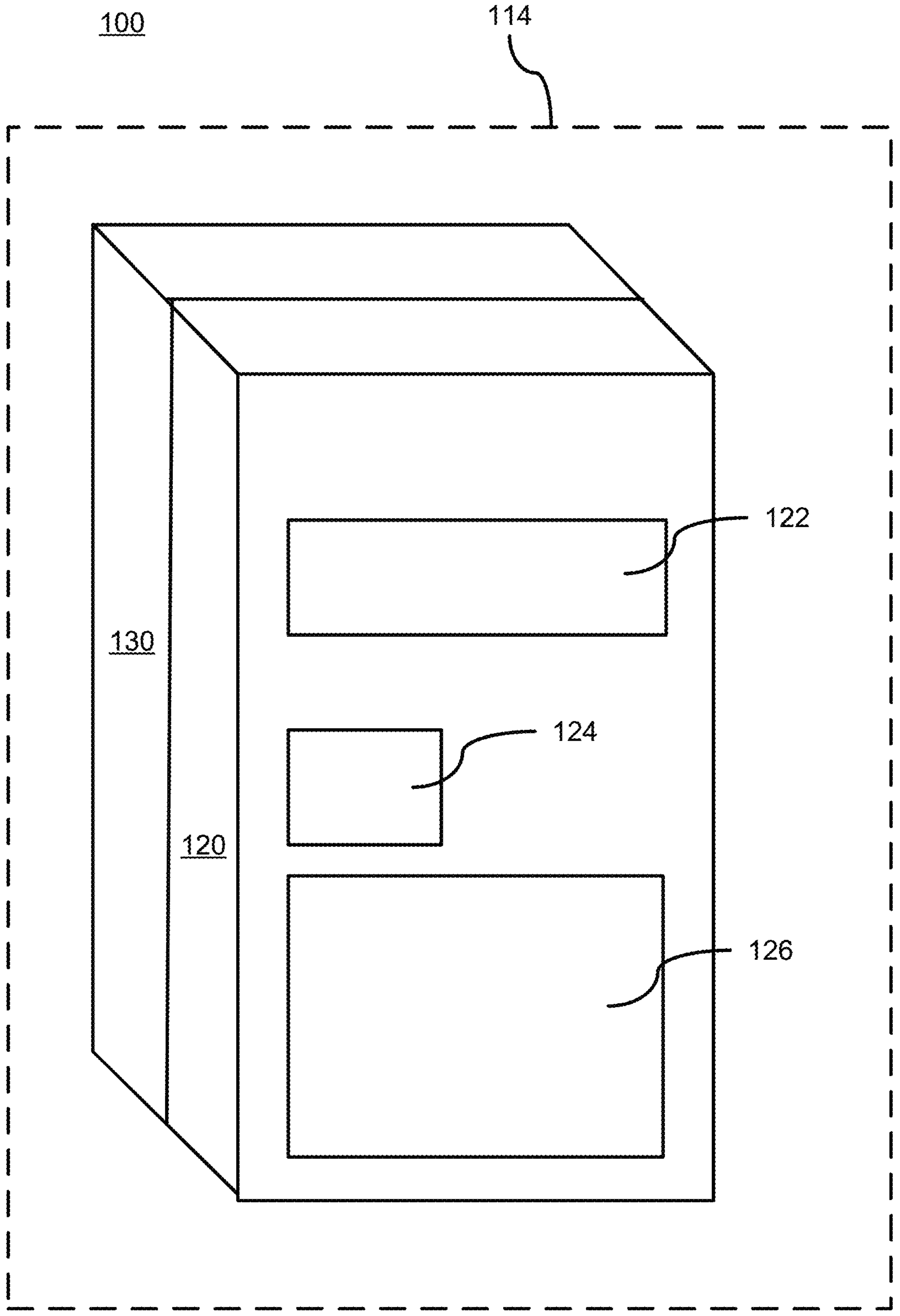
FIG. 1D is an example illustration of a medication container according to an embodiment of the present disclosure.

FIG. 1D illustrates an exemplary embodiment of medication container 100. Medication container 100 may include a durable part 114 (e.g., further including a circuit board, battery, or motor). The durable part 114 may include a first piece 120 and a second piece 130, e.g., such that the durable part 114 opens up (e.g., by a hinge or locking mechanism). The first piece 120 and the second piece 130 may be operably attached to secure any medication stored within and the medication container may include any number of security features (e.g., manual locking mechanism, software controlled electromechanical lock, etc.) to prevent unauthorized access to the medication. Moreover, the durable part may include a keypad 122 (e.g., alphanumeric buttons 110, a touchscreen, a sensor, etc.), a fingerprint reader 124, or a display 126. As shown in FIG. 1A, the keypad 122, fingerprint reader 124, and display 126 are disposed on the first piece 120. However, in some examples one or more of these components or features may be disposed in the first piece 120, the second piece 130, or any combination thereof. In an example, medication container 100 may include an input (e.g., keypad 122, fingerprint reader 124, or display 126) via which a patient or other user may enter a credential.

Figure 1E:
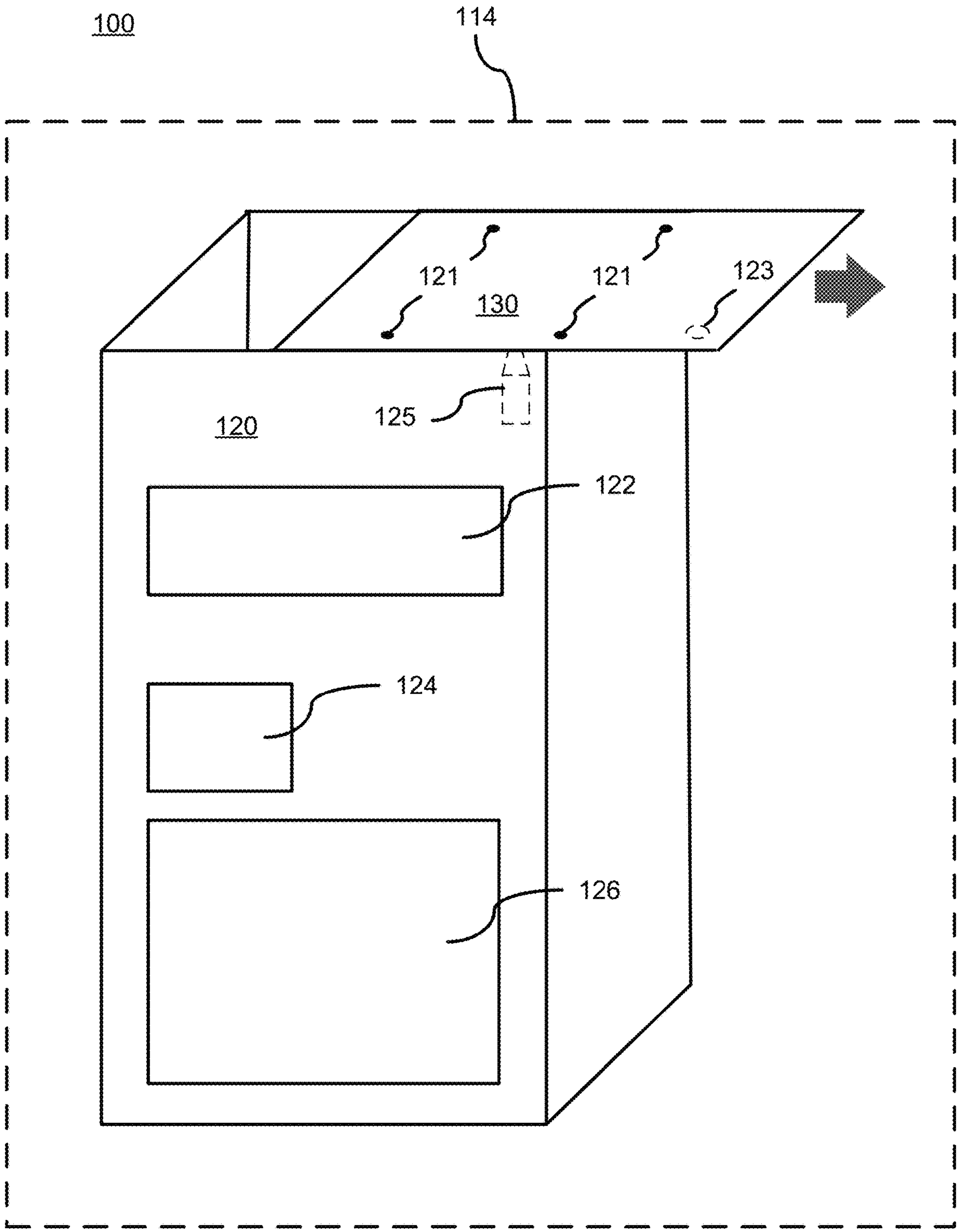
FIG. 1E is an example illustration of a medication container according to an embodiment of the present disclosure.

FIG. 1E illustrates an exemplary embodiment of medication container 100, where the durable part 114 may include a first piece 120 and a second piece 130, e.g., such that the durable part 114 opens up by removing the second piece 130 from the first piece 120. For example, the second piece may slide into place via one or more tongue and groove joints and may be electrically connected by one to the first piece 120 by one or more electrical connections 121. Moreover, a locking mechanism may ensure the second piece 130 is not separated from the first piece 120 by a patient or user. For example, a solenoid 140 (e.g., attached to the first piece 120) may be controlled by a processor to engage or disengage with a recess 123 in the second piece 130 to prevent unauthorized access to the medication.

Figure 1F:
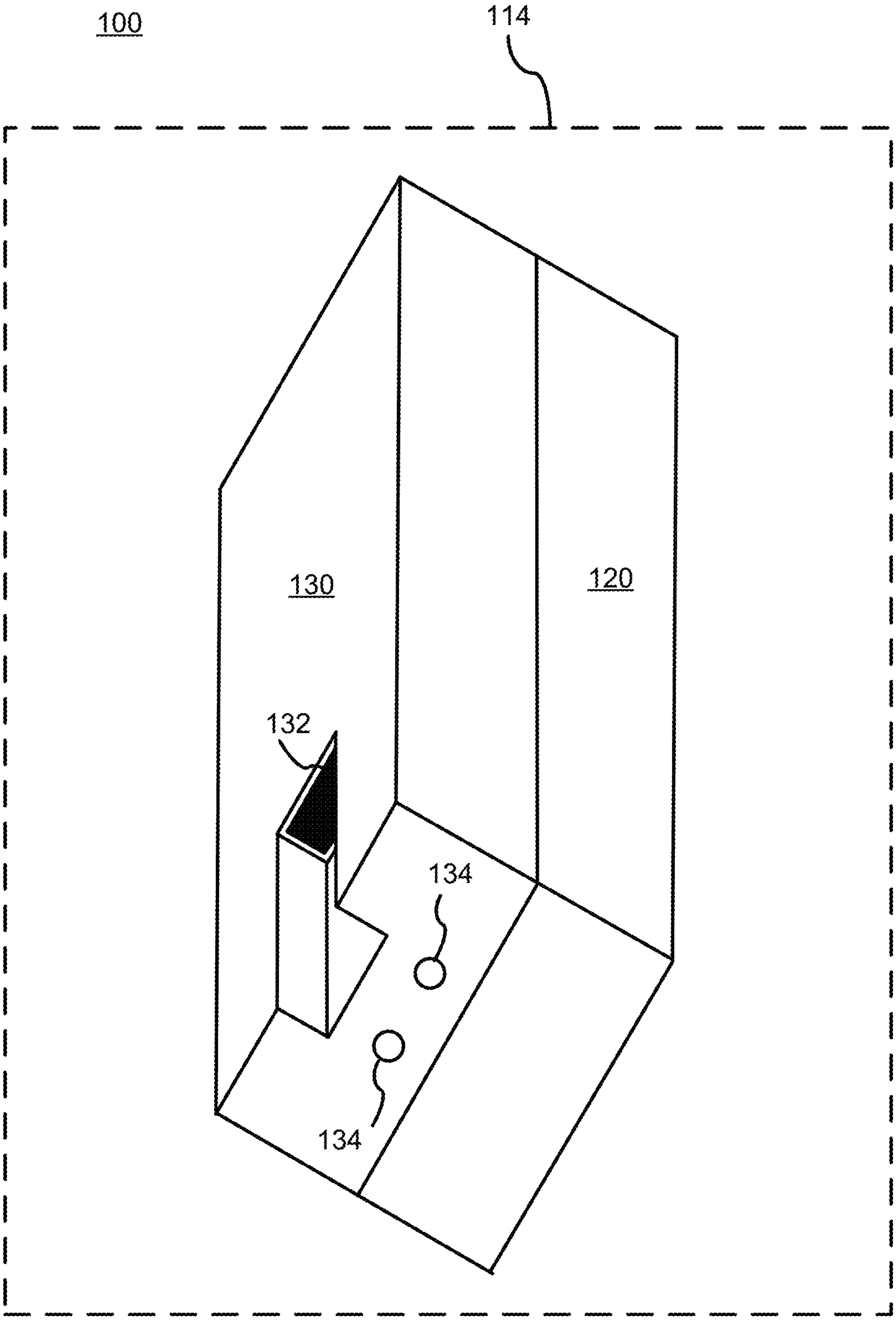
FIG. 1F is an example illustration of a medication container according to an embodiment of the present disclosure.

In an example illustrated in FIG. 1F, a bottom view of the medication container 100 illustrates a chute 132 (e.g., for dispensing medication) and one or more attachment screws 134 (e.g., for securing a motor). As shown in FIG. 1F, the chute 132 and one or more attachment screws 134 are disposed on the second piece 130. However, in some examples one or more of these components or features may be disposed on the first piece 120, the second piece 130, or any combination thereof.

Figure 1G:
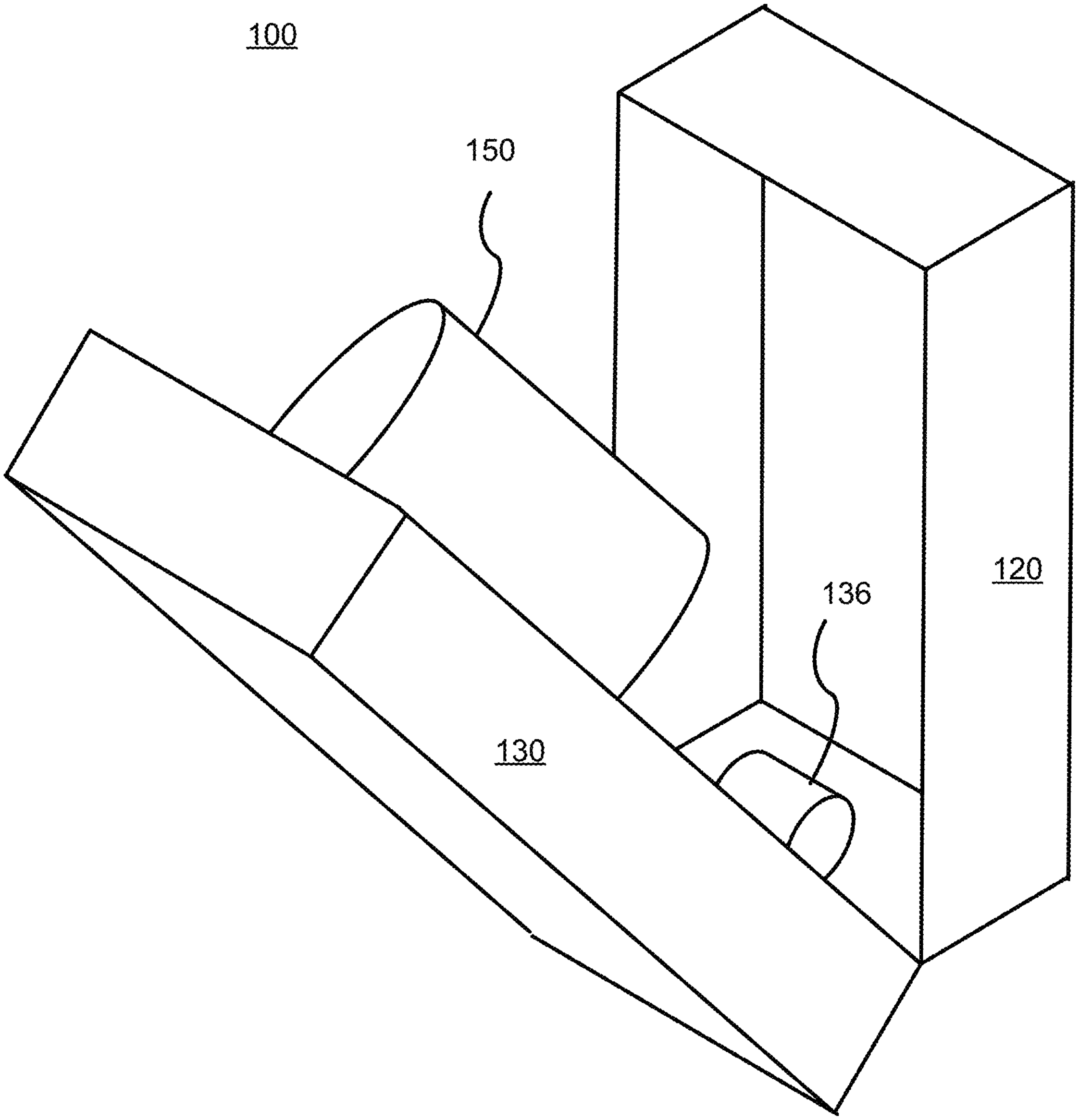
FIG. 1G is an example illustration of a medication container according to an embodiment of the present disclosure.

In an example illustrated in FIG. 1G, a hinge 136 may allow first piece 120 and second piece 130 of the durable part 114 to open. In some examples, the durable part 114 may be configured to house a disposable part 150. For example, a pharmacist may begin filling a prescription by placing medication in the disposable part 150 and may then place the disposable part 150 inside of the durable part 114.

Figure 1H:
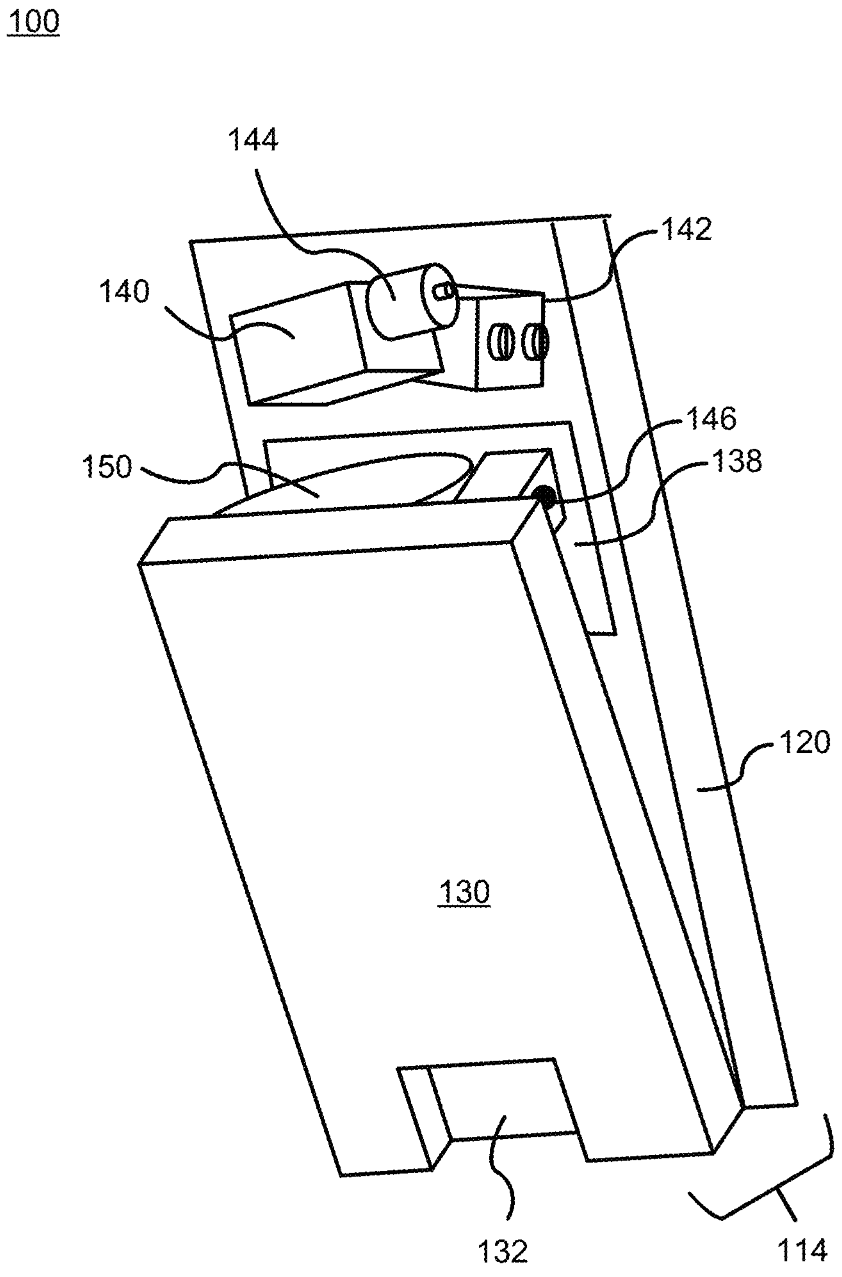
FIG. 1H is an example illustration of a medication container according to an embodiment of the present disclosure.

In an example illustrated in FIG. 1H, the durable part 114 may include a circuit board 138, a solenoid 140, and a battery 142. As shown in FIG. 1H, the circuit board 138, solenoid 140, and battery 142 (e.g., a 9-volt battery and battery connector) may be disposed on the first piece 120. However, in some examples one or more of these components or features may be disposed on the first piece 120, the second piece 130, or any combination thereof. In some examples, the durable part 114 may include a locking mechanism to operably connect the first piece 120 and the second piece 130, e.g., the solenoid 140 may extend a shaft 144 into a receptacle 146 sized to accept the shaft 144. In an example, the solenoid 140 may be activated by entering a specific keycode via the keypad 122, e.g., causing the solenoid 140 to retract the shaft 144 from a receptacle 146 so that the first piece 120 and the second piece 130 may be separated.

In some examples, the medication container 100 may include one or more sensors to detect an orientation of the medication container 100 (e.g., an accelerometer mounted-on or associated with circuit board 138). Thus, the medication container 100 may notify a user when oriented in a nonfunctional or non-ideal position (e.g., a position other than upright where the medication container 100 is incapable of dispensing pills or medication, such as upside down or laying on a side).

In some examples, the prescription securing device may include one or more communication interfaces, e.g., Bluetooth, WIFI, GSM, cellular, etc. The communication interfaces may allow the medication container 100 to communicate with one or more devices of the users, including mobile devices, computing devices, etc. Moreover, the communication interface(s) may enable the prescription securing device to communicate with one or more servers, websites, databases, cloud systems, etc. Multiple communication interfaces may provide redundancy so that the prescription securing device may still communicate with the user, pharmacist, server, apps, etc., when one form of communication is unavailable (e.g., cellular data connection when Bluetooth or Wifi connections are unavailable).

Figure 1I:
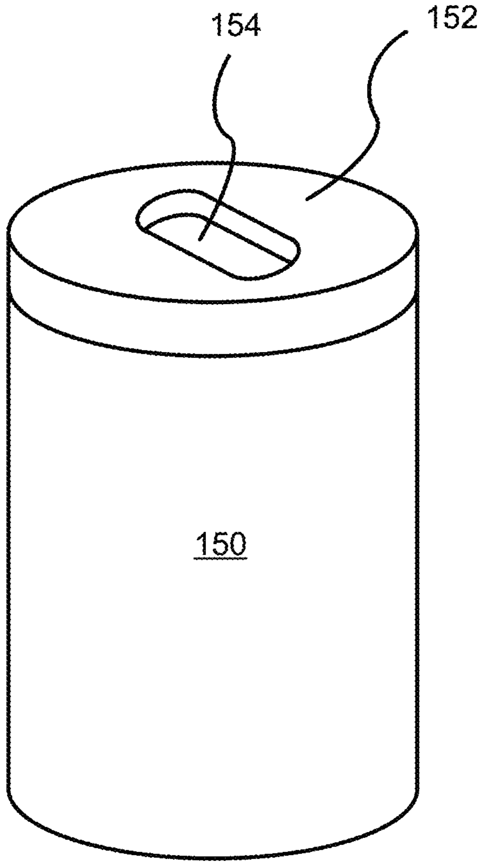
FIG. 1I is an example illustration of a medication container according to an embodiment of the present disclosure.

In an example illustrated in FIG. 1I, the disposable part 150 may include a lid 152. In some examples, the lid 152 may snap or screw into place on the disposable part 150. In some examples, the disposable part 150 or the lid 152 may include an indicator 154 of the size, shape, or type of pill or medication that is compatible with the disposable part 150. For example, a number of different disposable parts may be suited for a particular size, shape, or type of pill. The particular size, shape, or type of pill may be indicated by indicator 154, e.g., a notch, recession, marking, text, etc. Moreover, a pharmacist may match a particular pill to the indicator 154 by placing the pill in the indicator 154 to see if it fits, e.g., confirming a match between the pill and the disposable part 150.

Figure 1J:
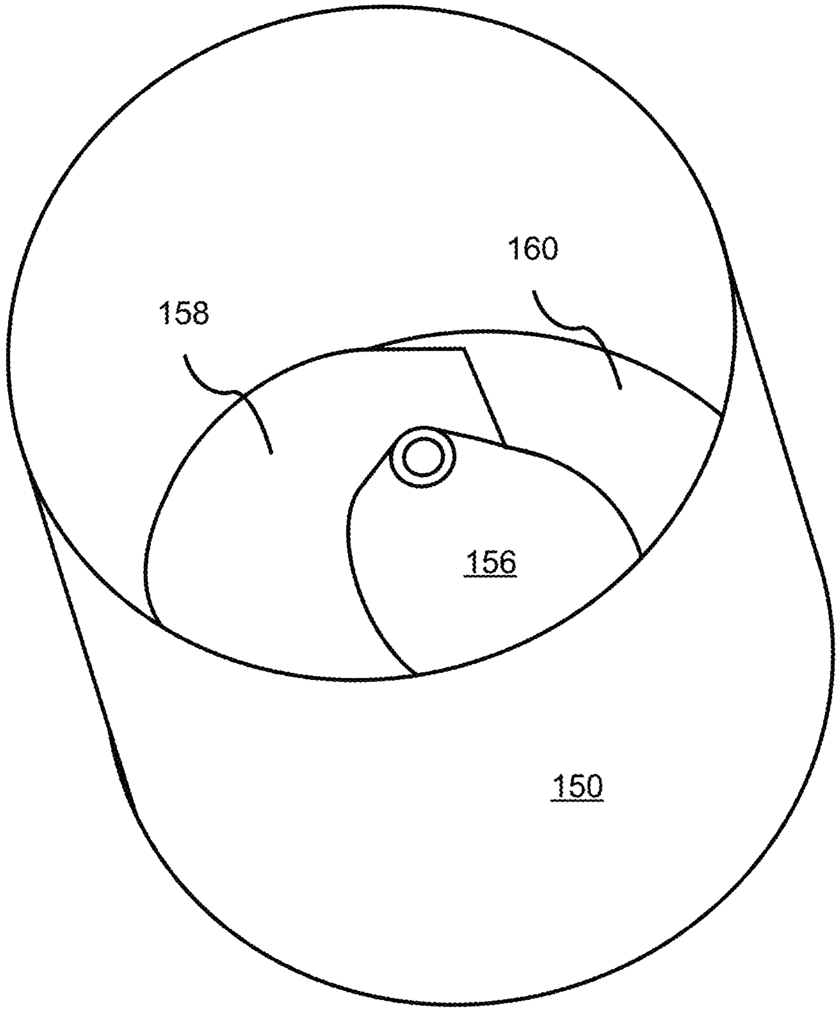
FIG. 1J is an example illustration of a disposable component of a medication container according to an embodiment of the present disclosure.

In an example illustrated in FIG. 1J, the disposable part 150 may include a cone 156, a scraper 158, or a turntable 160. In some examples, the cone 156 or scraper 158 are molded into or attached to another part of disposable part 150 (e.g., a body). The turntable 160 may be a separate part and may rotate within the disposable part 150. For example, the turntable may be captured by the scraper 158 and the cone 156. In some examples, the cone 156 may displace pills or medication housed inside the disposable part 150, such that the pills or medication rest along a periphery of the disposable part 150, e.g., over/on the turntable and not in the center of the disposable part 150.

In some examples, the height or diameter of the cone 156 may be selected based on the size or shape of a medication (e.g., a pill). For example, the cone 156 may have a larger diameter for a smaller pill and a smaller diameter for a larger pill. Thus, the space between an outer edge of the cone and a periphery of the disposable part 150 may increase as the size of a pill increases. In an example, the diameter of the cone 156 and associated space between the outer edge of the cone and a periphery of the disposable part 150 are selected to approximately match a dimension (e.g., length, width, or height) of a particular size of pill or range of sizes of pills.

Figure 1K:
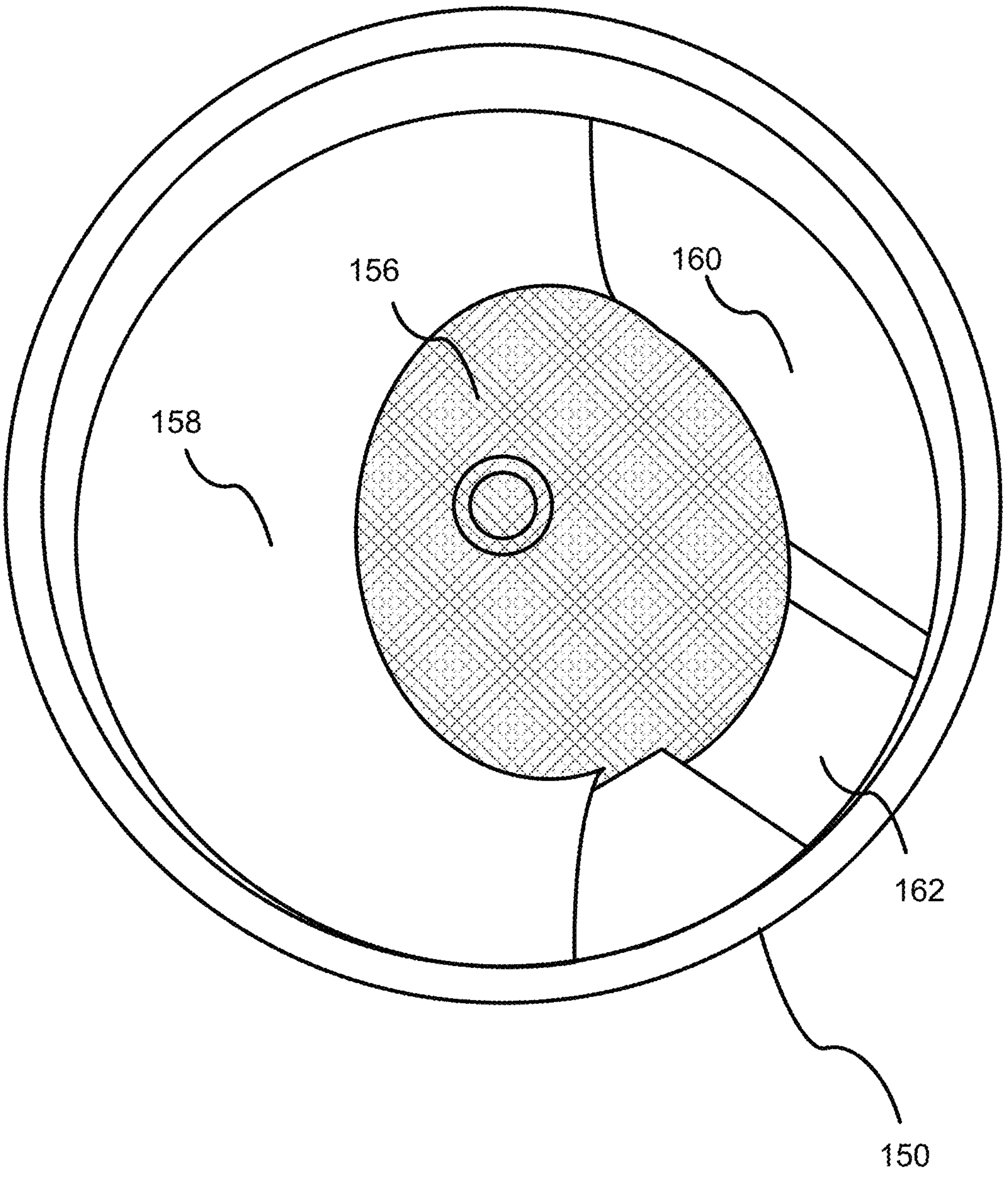
FIG. 1K is an example illustration of a disposable component of a medication container according to an embodiment of the present disclosure.

In an example illustrated in FIG. 1K, the turntable 160 may include a well 162. In some examples, the well 162 is sized (width, height, depth, etc.) to accommodate a specific number of pills or medication, for example a single pill. For example, the length, width, and height of the well 162 may be selected to accommodate a particular size (length, width, or height) of a particular pill, or a range of sizes of pills. Thus, as the turntable 160 rotates, the pills may be displaced by the cone 156 so that the pills rest on the turntable 160. A specific number of pills (e.g., one pill) may then fall into the well 162 based on the size of the pill(s) and the size of the well 162; the remaining pills resting on the turntable may be separated from the well 162 by the scraper 158.

Figure 1L:
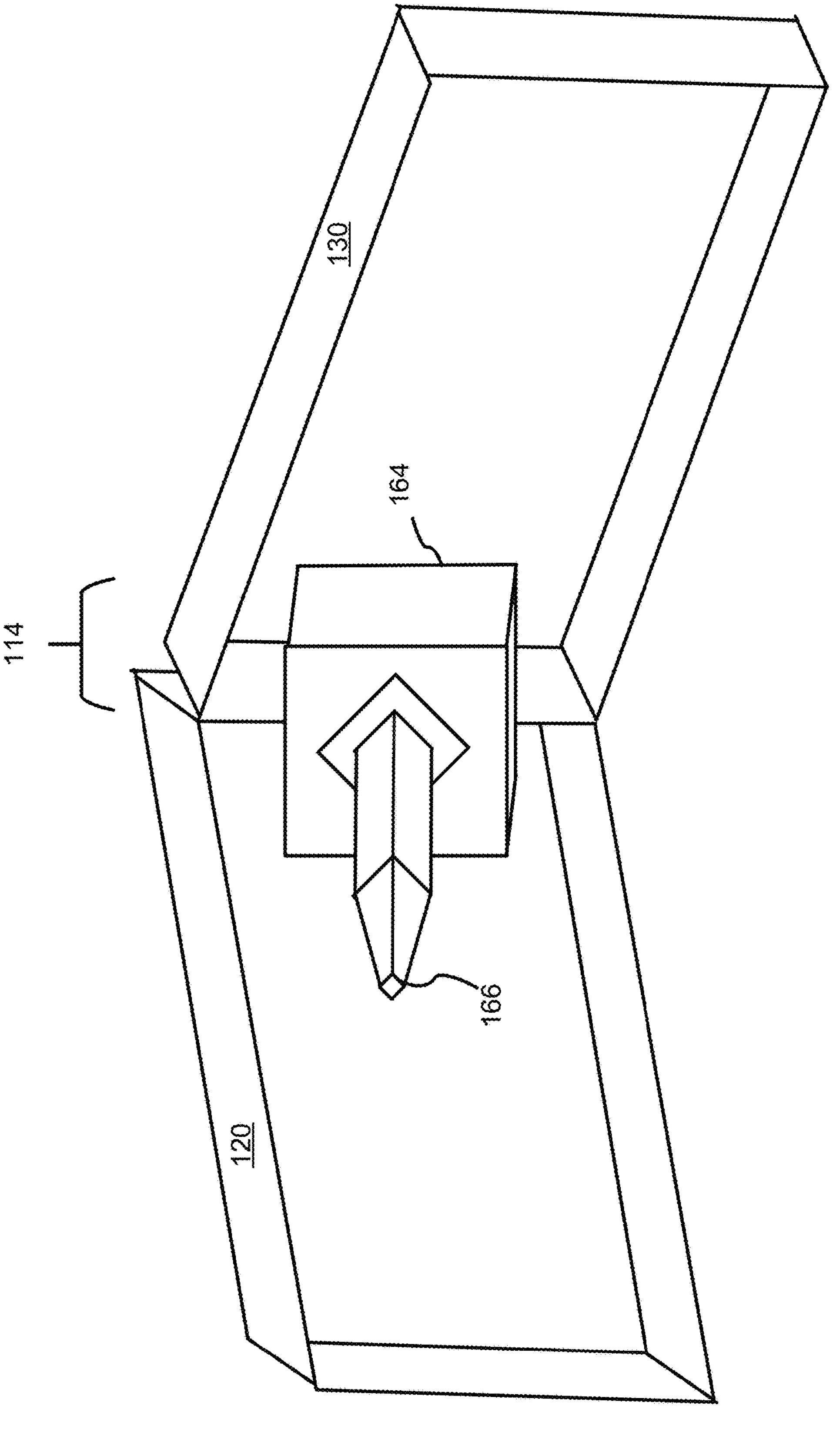
FIG. 1L is an example illustration of a durable component of a medication container according to an embodiment of the present disclosure.

In an example illustrated in FIG. 1L, the durable part 114 may include a motor 164 (e.g., a stepper motor) and an obelisk 166. For example, the motor may be secured by one or more attachment screws 134 and may be used to rotate turntable 148 (e.g., clockwise, counterclockwise, back and forth, etc.). Moreover, an obelisk 166 may be formed to fit inside of or otherwise complement disposable part 150. In an example, obelisk 166 may fit within disposable part 150 and as motor 164 turns obelisk 166, a connection between obelisk 166 and disposable part 150 may cause turntable 160 to turn. Accordingly, well 162 of turntable 160 may be advanced by motor 164 and obelisk 166. In some examples, the motor 164 may be a hand crank or manually operated mechanism.

Figure 1M:
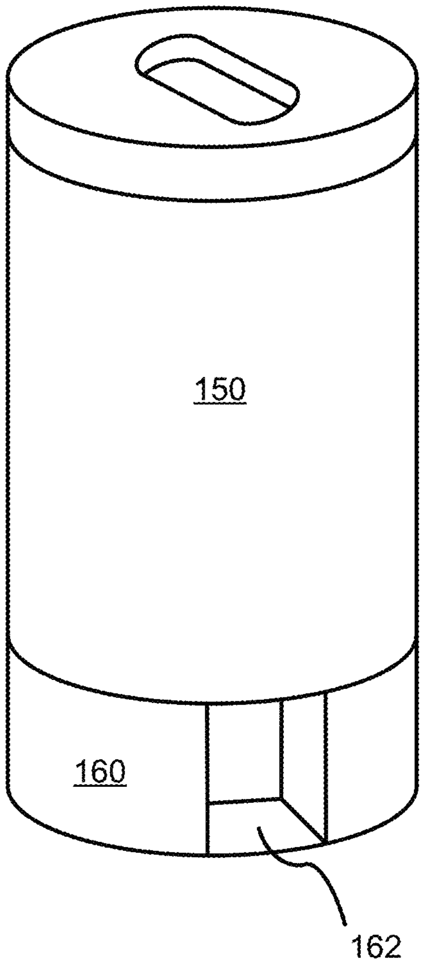
FIG. 1M is an example illustration of a disposable component of a medication container according to an embodiment of the present disclosure.

As further illustrated in FIG. 1M, the well 162 may be rotated as turntable 160 is rotated. Moreover, the turntable 160 may be rotated in a vibratory manner (e.g., back and forth) or in concert with a vibratory mechanism (e.g., using a vibratory motor, piezo element, etc.) until a pill falls into the well 162. Moreover, one or more rumbling strips disposed on a surface of the disposable part 150 may create interference with the turntable 160 as it rotates. Thus, in an example, a pill or medication captured within well 150 may be deposited from the chute 132 of durable part 114 when the well 162 aligns with the chute 132. For example, the motor 164 may stop turning the obelisk 166 when the well 162 and the chute 132 are aligned. Moreover, in some examples, a sensor such as an optical sensor may detect that a pill or medication is captured within the well 162. For example, a captured pill may be identified as the turntable 160 makes a 360-degree rotation or continuously alternates between two orientations (e.g., from one end of the scraper 158 to the other end of the scraper 158) until a sensor detects a pill in the well 162. Moreover, in some examples, a sensor such as an optical sensor may detect that a pill or medication captured within the well 162 has been dispensed (e.g., identified that pill or medication has dropped through the chute 132).

Figure 1N:
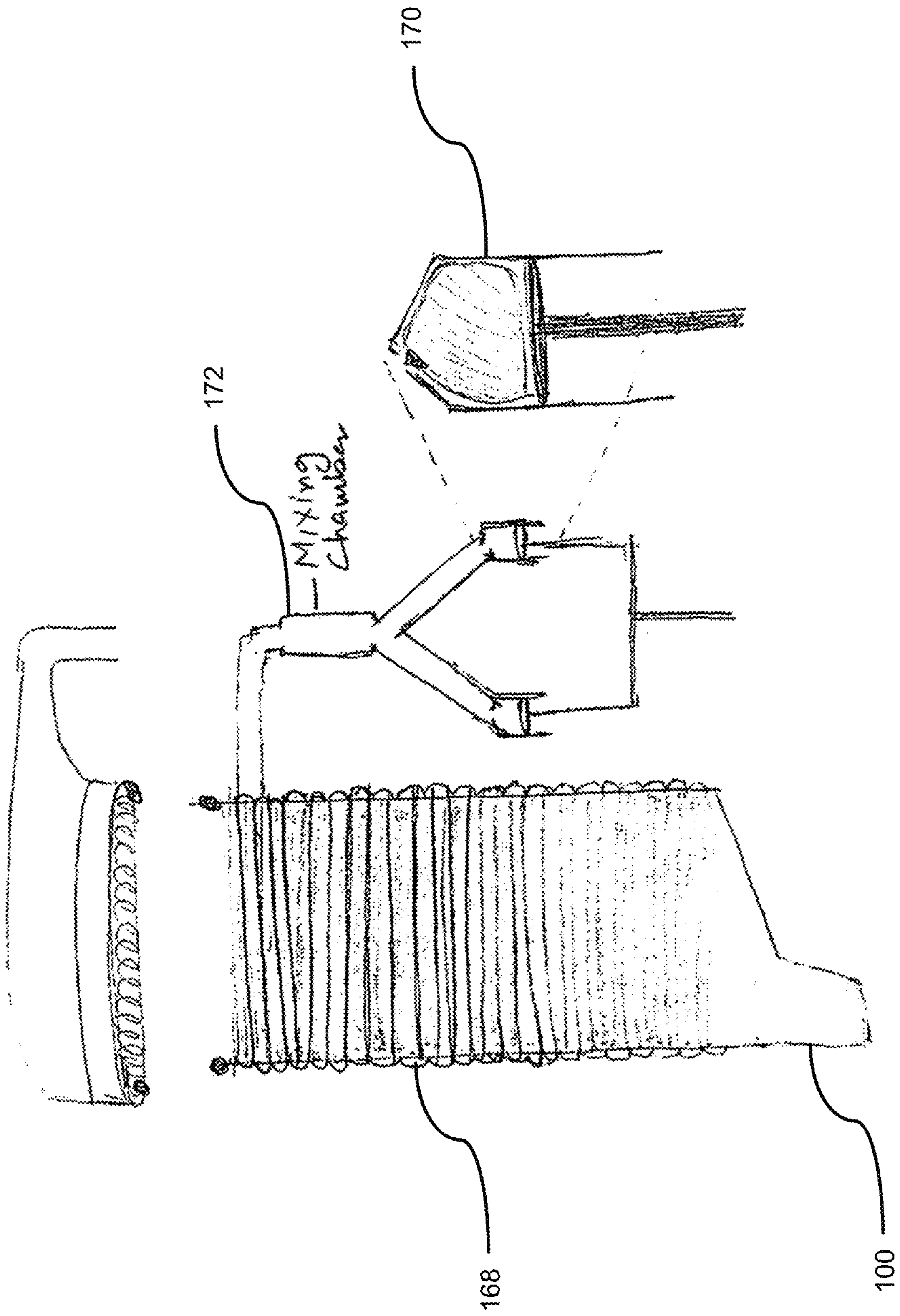
FIG. 1N is an example illustration of a destruction mechanism of a medication container according to an embodiment of the present disclosure.

As illustrated in FIG. 1N, one or more examples may include a loop of wire 168, e.g., built into the side or wrapped around the durable part 114 or the disposable part 150. The loop of wire 168 may be continuous, creating a barrier within or around the durable part 114 or the disposable part 150. Moreover, a signal may be transmitted throughout the wire 168 and the signal may be detected if the wire remains unbroken (e.g., checking for a voltage drop at one end of the wire. However, if the durable part 114 or disposable part 150 is tampered with (e.g., breached or broken), the respective loop of wire 168 may no longer carry the signal and it may be determined that the loop of wire 168 has been broken.

In some examples, one or more actuators 170 may be triggered by a breach or break of the loop of wire 168. The one or more actuators 170 may be attached to or contained within one or both of the durable part 114 or the disposable part 150 and may apply pressure on one or more individual vessels containing separate chemicals based on detecting a breach or break in the loop of wire 168. In an example, separate chemicals may form a foaming or hardening agent when joined, e.g., in order to render the pills or medication unusable as a result of detected tampering. Moreover, the separate chemicals may be joined in a mixing chamber 172 prior to entering the disposable or replaceable part 40.

In some examples, the durable part 114 or may include one or more chemical storage vessels (e.g., one or more spring loaded syringes). A plunger of the one or more spring loaded syringes may be partially or fully immobilized (e.g., directly or indirectly) by a mechanical apparatus (e.g., latching mechanism, actuator, locking pin, etc.). When the continuous loop of wire 168 is broken, the one or more spring-loaded syringes may be freed to expel the contents of the one or more spring-loaded syringes (e.g., by removing or retracting the mechanical apparatus). For example, when the wire 168 is broken, one or more actuators blocking a portion of one or more spring-loaded syringes containing chemicals as fast-acting adhesives (e.g., cyanoacrylate, polyurethane, epoxy, etc.), foaming agents, bittering agents (e.g., denatonium), coloring agents, alkaline compounds, acidic compounds, and/or chemical accelerators. The spring-loaded syringes may then expel the stored chemicals into the disposable part 150, ruining the stored medication or pills and preventing the user from circumventing the secured container to obtain unauthorized pills or medication.

In an example, an user may attempt to obtain pills or medication by breaking into the medication container 100. As the user breaches the disposable part 150, the medication container 100 may detect the breach based on no longer detecting a signal through the loop of wire 168. In another example, the medication container 100 may detect the breach based on identifying an attempt to access the medication via the chute 132 or well 162 (e.g., by detecting a foreign object using one or more sensors associated with pill detection). For example, the medication container 100 may normally expect a first sensor to detect a pill in the well 162 and then a second sensor to detect the pill passing through the chute 132 as the pill is dispensed. A breach may be identified if the second sensor detects an object in the chute 132 without a prior detection of an object in the well 162. In another example, dispensing of a pill may include a first sensor detecting a pill passing through a first portion of the medical container 100 and then a second sensor may detect the pill passing through a second portion of the medical container 100. Thus, a breach may be identified if the second sensor detects an object prior to a detection by the first sensor.

As a result of the identified breach, actuators 170 may be triggered to apply pressure to individual vessels containing separate chemicals. The separate chemicals may be subsequently joined in a mixing chamber 172 and the resultant hardening or foaming agent (e.g., epoxy, etc.) may be dispersed throughout the disposable part 150 of the medication container 100. Thus, the user will be unable to obtain usable pills or medication by breaking into or tampering with the medication container 100.

Figure 1O:
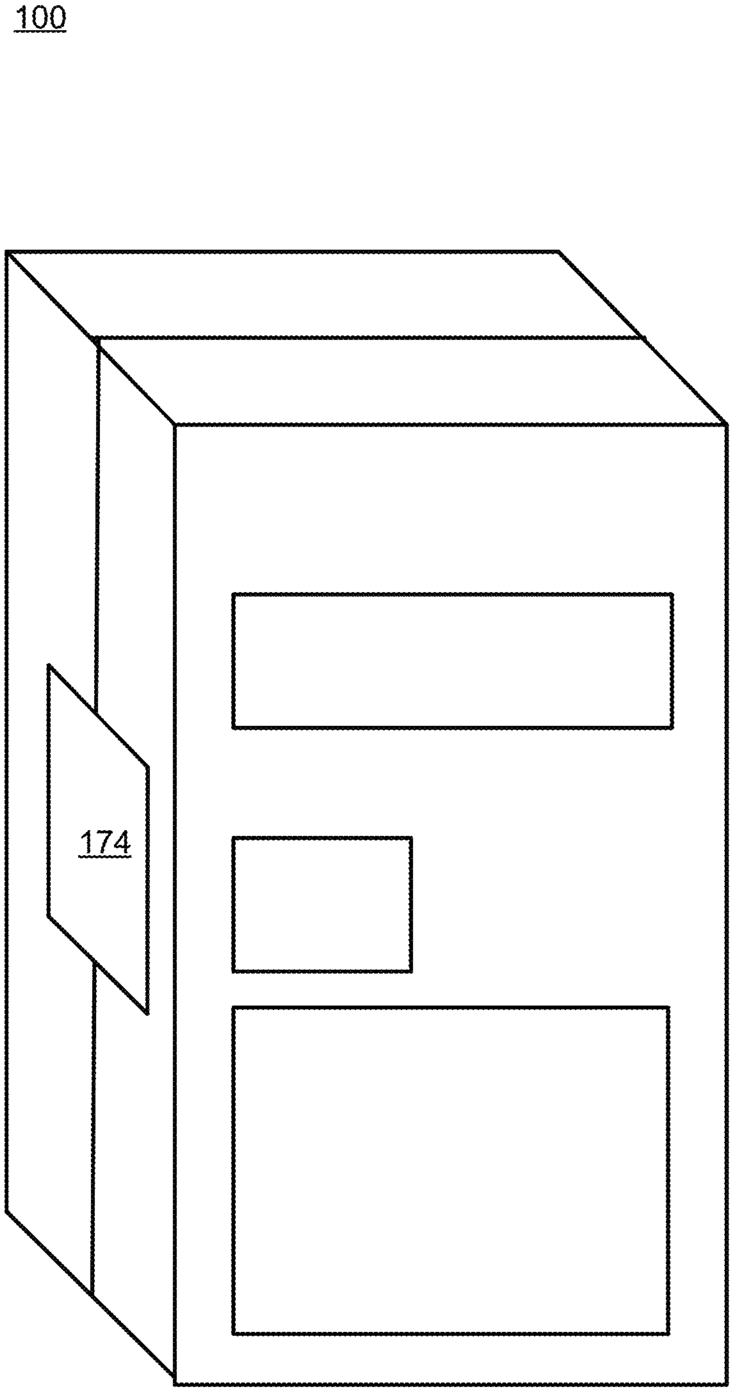
FIG. 1O is an example illustration of a medication container according to an embodiment of the present disclosure.
Figure 1P:
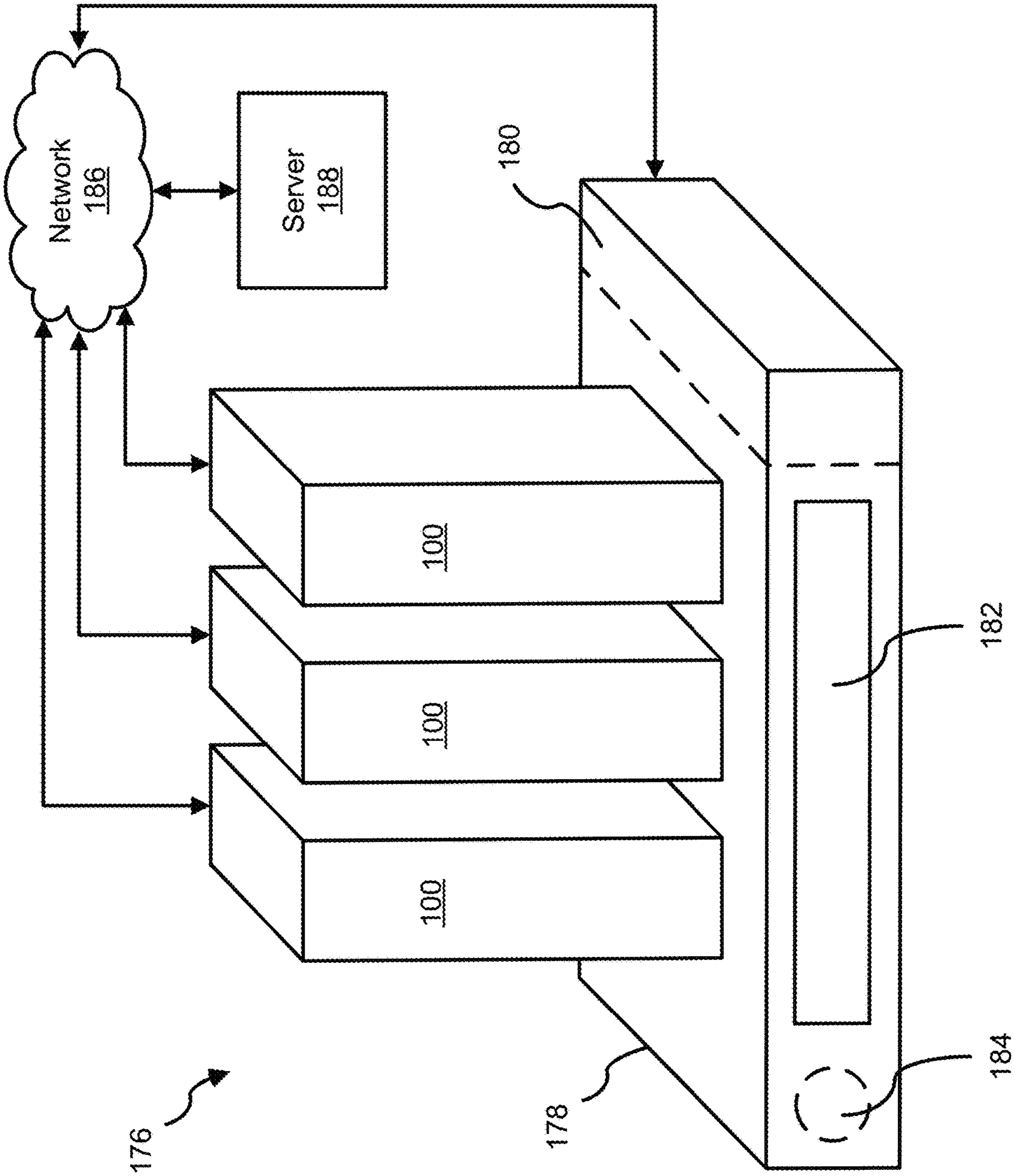
FIG. 1P is an example illustration of a grouping of medication containers according to an embodiment of the present disclosure.

As illustrated in FIG. 1O, in some examples, the medication container 100 may include a pouch 174 for holding one or more unsecured pills or medication. For example, if a user has difficulty getting their medication from the medication container 100, they may access the unsecured medication stored in the pouch 174 until they are able to consult with a pharmacist. As illustrated in FIG. 1P, in some examples, an operating environment 176 may include one or more medication containers (e.g., medication container 100) attached to another object (e.g., base 178). In an example, the medication containers 100 may dispense medication into a tray 182 of the base 178 in accordance with a schedule determined by a pharmacist or physician.

Moreover, the base 178 may include one or more processors, batteries, communication devices, audio or visual indicators, or input devices, e.g., located in portion 180 of the base 178. In some examples, the base 178 may include one or more sensors (e.g., sensor 184) to detect a presence of any dispensed medication in the tray 182. Likewise, the base 178 may determine the absence of any dispensed medication in the tray 182 based on detection information received from the sensor 184.

In some examples, the base 178 and one or more of the attached medication containers 100 may be connected to a network 186, e.g., via a wired or wireless connection. Moreover, the network 186 may be connected to a server 188. In an example, the base 178 may communicate information regarding the dispensing of medication by the medication containers 100. For example, the base 178 may communicate to the server 188 (e.g., via network 186) that dispensed medication has persistently remained present in the tray 182. Accordingly, the server may notify a doctor or an interested third party that the patient is not taking their medication or may be incapacitated.

Figure 2:
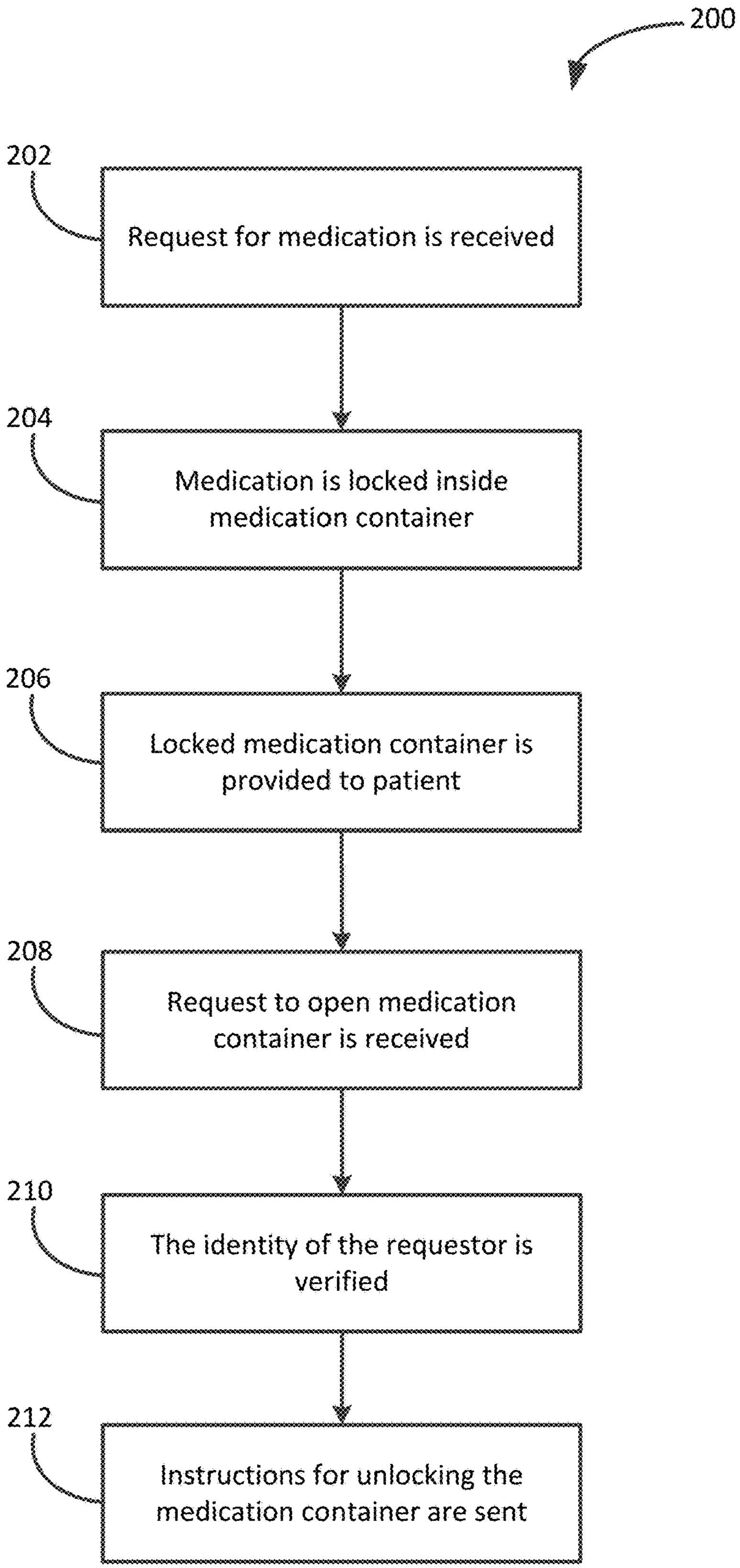
FIG. 2 is a block diagram describing a method for utilizing a medication container according to an embodiment of the present disclosure.

FIG. 2 illustrates an exemplary method 200 of utilizing medication container 100 to securely provide medication to a patient or caregiver. At step 202, a request for medication is received, such as by a pharmacy or other medication provider. The request may be initiated by a patient or caregiver, for example, the request may include the name (or other identifier) of a medication or a prescription for a medication. For example, if the medication is a nonprescription medication, then the name of the medication may be received. If the medication requires a prescription, then the prescription may be received. The request for the medication may be received by a telecommunication system associated with the pharmacy or other medication provider.

At step 204, medication may be locked inside medication container 100. For example, the medication may be placed inside housing 102 by the pharmacy or other medication provider, including an automated medication dispensing device. The medication may be locked inside housing 102 using locking mechanism 106. For example, after the pharmacy or other medication provider puts the medication into housing 102, the pharmacy or other medication provider may configure or program locking mechanism 106 with a credential by which locking mechanism 106 may be unlocked by the patient or caregiver. Alternatively, locking mechanism 106 may already be configured with a factory pre-set credential to unlock locking mechanism 106. In either case, the credential to unlock locking mechanism 106 may be recorded (e.g., in a telecommunication system associated with the pharmacy or other medication provider) so that it may later be provided to the patient or caregiver to unlock medication container 100 that is in his or her possession, as will be discussed below.

Further, medication container 100 may be associated with a container identifier (e.g., an alphanumeric code) uniquely identifying medication container 100. The container identifier may be affixed or otherwise indicated on medication container 100, but is not necessarily so. The container identifier may be used by the pharmacy or other medication provider to identify the particular medication container 100. For example, the patient or caregiver may provide the container identifier when he or she contacts the pharmacy or other medication provider to receive the credential to unlock medication container 100, whereby the pharmacy or other medication provider may use the container identifier to look up the credential to unlock medication container 100. Accordingly, the container identifier may be recorded (e.g., in a telecommunication system associated with the pharmacy or other medication provider) in association with the corresponding credential before medication container 100 is provided to the patient or caregiver by the pharmacy or other medication provider.

At step 206, medication container 100, now locked and containing the medication, may be distributed to the patient or caregiver. In the event that the container identifier is not indicated on medication container 100 itself, the container identifier may be separately provided to the patient or caregiver. Thus, the container identifier may serve as an authentication to the pharmacy or other medication provider that the patient or caregiver is authorized to access the medication within medication container 100, as opposed to someone that had just found or stolen medication container 100.

At step 208, a request to gain access to the medication within medication container 100 may be received, for example, by the pharmacy or other medication provider that originally provided medication container 100. This request may, for example, be a telephone call, a text message, an internet request, a request through a smart phone application, or use other type of communication media. In an aspect, the request may include the container identifier, which may be used to determine the credential needed to unlock medication container 100. For example, the pharmacy or other medication provider may use the container identifier in a telecommunication system to cross-reference the container identifier with a table of container identifiers and associated medication container credential, thereby determining the credential for the patient's medication container 100.

At step 210, the identity of the patient or caregiver may be verified, for example, by the pharmacy or other medication provider. The verification may occur via any known methods of authentication, a biometric authentication, receiving answers to previously provided authentication questions, or other similar methods. As another example, the identity of the patient or caregiver may be verified via the patient or caregiver providing the container identifier to the pharmacy or other medication provider.

At step 212, instructions for unlocking medication container 100 may be provided by the pharmacy or other medication provider to the patient or caregiver. The instructions may be provided using various methods, such as text, email, spoken, etc. The instructions may include the credential associated with medication container 100 and usable to unlock locking mechanism 106 of medication container 100. Accordingly, the patient or caregiver may use the provided credential to unlock locking mechanism 106 and access the medication within housing 102.

In an aspect, the prescription may be for medicine that is currently needed, will be needed in the future, or medicine that may conditionally be needed. For example, a traveler may be leaving to visit a foreign country where diseases exist that do not exist in the traveler's country of departure, such as malaria or the zika virus. Further, in the destination country, certain medicines to combat the diseases may not be readily available. The traveler may obtain medication container 100 with the appropriate medicine from his country of departure as a precaution in case he contracts such a disease.

If the traveler does contract one of such diseases, the traveler may then contact the pharmacy or doctor from where he received medication container 100 to inform them that he needs the medicine locked in medication container 100. This may be done if the traveler has a doctor in the destination country diagnose him with the disease, or he may call his doctor in his country of origin and explain his symptoms. Instructions (e.g., the credential to unlock) may then be sent to the traveler for how to unlock the medication container. For example, medication container 100 may contain a combination lock, and the instructions may include the combination.

Sometimes medicines can be highly addictive or powerful substances. In such as case it may be important that the person prescribed the medication only take the medication if it is truly needed or exactly as prescribed so as to avoid abuse or addiction. For that reason, the medicine may be locked in medication container 100.

Verification may be required to ensure that the requestor is the person to whom the medication was issued or prescribed. Verification may be executed in numerous ways. For example, the requestor may be required to provide a spoken password, providing a password via a mobile device, or other similar known methods of providing a verification credential. Biometric verification may also be used, such as a fingerprint reader, eye scanner, voice recognition, and the like.

Figure 3:
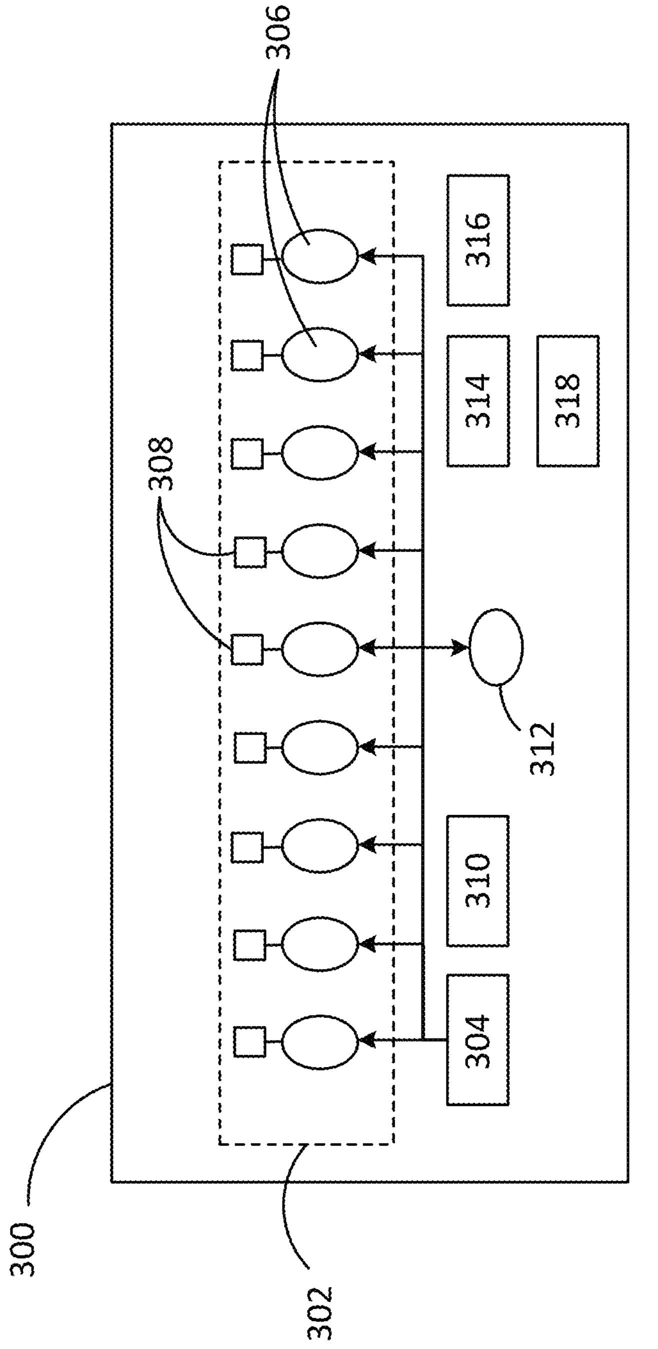
FIG. 3 is example illustration of a medication container according to an embodiment of the present disclosure.

FIG. 3 depicts an alternative embodiment of a medication container. Medication container 300 may include sections for one or more medicines, such as section 302. Section 302 may include a plurality of compartments 306 and one or more locking mechanisms 304. In an aspect, each compartment 306 is operatively coupled to the same locking mechanism 304 to lock and unlock all, a subset, or just one of compartments 306. Locking mechanism 304 may be programmed or otherwise configured to only open one or a subset of compartments 306 upon entry of a valid credential associated with that one compartment 306 or subset of compartments 306. For example, locking mechanism 304 may be programmed to unlock a first compartment 306 (or a first subset of compartments 306) upon entry of a first credential. Locking mechanism may further be programmed to open a second compartment 306 (or a second subset of compartments 306) upon entry of a second, different credential. In another aspect, each compartment 306 is operatively coupled to a different locking mechanism 304. Medication container 300 may further include at least one destruction mechanism 308.

Locking mechanism 304 may include one or more numbered dials that, when the right combination of numbers is selected, will unlock one or more lockable compartments 306. In another example, locking mechanism includes a series of buttons that, when pressed in the right combination or order, unlock one or more compartments 306. In another example, locking mechanism 304 may be electronic and connected to a network. In another example, locking mechanism 304 may be electronic and connected directly to a mobile device via communication protocol such as Bluetooth® or Near Field Communication (NFC). At a specific time, locking mechanism 304 may receive instructions to unlock a particular compartment 306. Each day a different compartment 306 may be opened. It can be appreciated that there are numerous types of locking mechanisms, as described above, that can be used to lock and unlock compartments 306.

Medication container 300 may be configured with display 310. Display 310 may be any type of known display such as an LED, LCD, or the like. Display 310 may display a credential (e.g., a code) that may be used to unlock locking mechanism 304. The credential may be displayed on display 310 only at specific time intervals. Further, the particular credential displayed during a time interval may only be usable to unlock locking mechanism 304 during that time interval. During a first predetermined time interval, a first unique credential for unlocking a first compartment 306 may be displayed on display 310. During a second predetermined time interval, and a second unique credential for unlocking a second compartment 306 may be displayed on display 310, and so forth. Display 310 may only display a credential for unlocking locking mechanism 304 during the first, second, etc. predetermined time intervals. Outside the first, second, etc. predetermined time intervals, locking mechanism 304 may be deactivated.

In an example, a user may have a prescription to take a medicine twice a day, once in the morning and once in the evening. A first credential may be displayed on display 310 from 8 am-10 am that unlocks a first compartment 306 from 8 am-10 am. A second credential may be displayed on display 310 from 8 pm-10 pm that unlocks a second compartment 306 from 8 pm-10 pm. At all other times no credential may be displayed on display 310 and no credentials are valid, preventing any compartment 306 from being opened.

In an aspect, the predetermined time intervals may be set by the pharmacy or other medication provider before the filled medication container 300 is provided to the patient or caregiver. Alternatively, medication container 300 may be connected, via a network (such as network 512 in FIG. 5), to a computing device with an interface (such as medication provider interface 514 in FIG. 5). The computing device may, for example, be associated with a pharmacy that fills medication container 300. Medication container 300 may receive a credential for unlocking locking mechanism 304 from the computing device with instructions to display the credential for a predetermined amount of time or for the predetermined time interval. The computing device may allow pharmacists or doctors to remotely change the accessibility of the medication in medication container 300 as needed.

In one aspect, display 310 may present a notification that locking mechanism 304 is activated to accept a credential (e.g., a biometric identifier) during a time interval, and subsequently grant access to one or more compartments 306 upon the provision of a valid credential. The notification may serve to indicate to the patient or caregiver that he or she should enter a credential input during the indicated time interval. For example, in an embodiment in which locking mechanism 304 comprises a biometric lock, display 310 may provide a notification for a time interval that the patient or caregiver should enter their biometric identifier, such as a fingerprint. If the patient or caregiver successfully provides a valid biometric identifier during that time interval, locking mechanism 304 will unlock one or more compartments 306 and thereby grant the patient or caregiver access to the medication therein. If the patient or caregiver does not enter a valid biometric identifier during the time interval, locking mechanism 304 will be deactivated and no longer accept a biometric identifier, even if otherwise valid, until a next valid time interval begins. A subsequent second time interval may be commenced at which point locking mechanism 304 may be reactivated to accept a valid biometric identifier and unlock one or more compartments 306. Instructions to commence a time interval and display the notification that locking mechanism 304 is activated to accept a credential and to enter the time interval during which locking mechanism 304 is activated may be provided to medication container 300 via a network connection. For example, a pharmacy or other medication provider may communicate such instructions to medication container 300 over a network.

Display 310 may additionally be used to provide information or a message to the patient or caregiver regarding the medication contained within medication container 300. For example, one technique to prevent a patient from over-consuming or under-consuming a medication is to require the patient to undergo a "pill count," wherein the patient travels to the medication provider and the medication provider observes the number or quantity of medication remaining in the container. To this end, medication container 300 may be configured to receive a message (e.g., the aforementioned pill count request) or other information from the medication provider and display this message on display 310. Medication container 300 may receive the message from a telecommunication system associated with the medication provider over a network (such as network 512 shown in FIG. 5).

Destruction mechanism 308 may be disposed inside or otherwise in association with lockable compartments 306. In an aspect, destruction mechanism 308 may be operatively coupled to lockable compartments 306. Destruction mechanism 308 may be a mechanism that can destroy or other render unusable any medicine disposed in lockable compartments 306. For example, destruction mechanism 308 may house a liquid, such as a spoiling agent, that, when destruction mechanism 308 is activated, may be released into at least one of locking compartments 306 to destroy or render the medication disposed within un-useable. Destruction mechanism 308 may prevent medication housed inside locking compartments 306 from being accessed without locking mechanism 304 being properly unlocked. Destruction mechanism 308 may be activated upon a determination that one or more unauthorized attempts have been made to access the medicine contained within locking compartments 306 or that medication container 300 has otherwise been tampered with. For example, destruction mechanism 308 may be activated upon a determination that an incorrect credential has been entered into locking mechanism 304 a number of times equal to or greater than a predetermined threshold. Destruction mechanism 308 may, in some aspects, be mechanically activated by an improper access attempt. For example, the body of medication container 300 may be configured with destruction mechanism 308 such that if there was a breach or other trauma to the body, destruction mechanism 308 would activate.

Medication container 300 may be further configured with antidote compartment 312, which may contain a medication or other substance that may be an antidote to the medication provided in compartments 306. The antidote provided in antidote compartment 312 is not limited to an antidote, per se, of the medication provided in compartments 306 but may refer generally to a medication or other substance that may be used to counteract or otherwise ameliorate a condition caused by the medications provided in compartments 306. As one example, if compartments 306 provide an opioid pain reliever, antidote compartment 312 may provide naloxone, which may be used to treat opioid overdose. Antidote compartment 312 may be operatively coupled with locking mechanism 304. As such, antidote compartment 312 may be unlocked via input of a credential to locking mechanism 304. For example, medication container 300 may be configured, such as by the pharmacy or other medication provider originally providing medication container 300, with an antidote credential. If the antidote credential is entered to locking mechanism 304, antidote compartment 312 may be unlocked and accessible. As described above with respect to compartments 306, the antidote credential may be displayed via display 310 for a set time interval and the antidote credential is only valid during that time interval.

Medication container 300 may further be configured with processor 314 and memory 316 communicatively connected to processor 314. Memory 316 may receive, store, and/or provide instructions to effectuate various operations relating to medication container 300. Medication container 300 may also include network interface 318 to effectuate communications with, for example, a telecommunication system associated with the pharmacy or medication provider. Network interface 318 may be embodied as a Wifi interface, a Bluetooth® interface, a cellular interface, or an ethernet interface, as some examples.

In an example, two or more medication containers 300 may be physically attached to each other or to another object (e.g., a medication tray). Moreover, the two or more medication containers may dispense medication into the medication tray at time intervals based on a predefined schedule, e.g., as programmed by a pharmacist when the prescriptions are filled in their respective medication containers 300.

In another example, the medication container 300 may be opened by a pharmacist in case of a failure of the medication container 300. For example, a pharmacist may use a backup mechanism (e.g., a specialized tool) to open the medication container 300 and retrieve medication in case of a failure. Moreover, a security seal may be used to identify any unauthorized access or tampering with the backup mechanism.

Figure 4A:
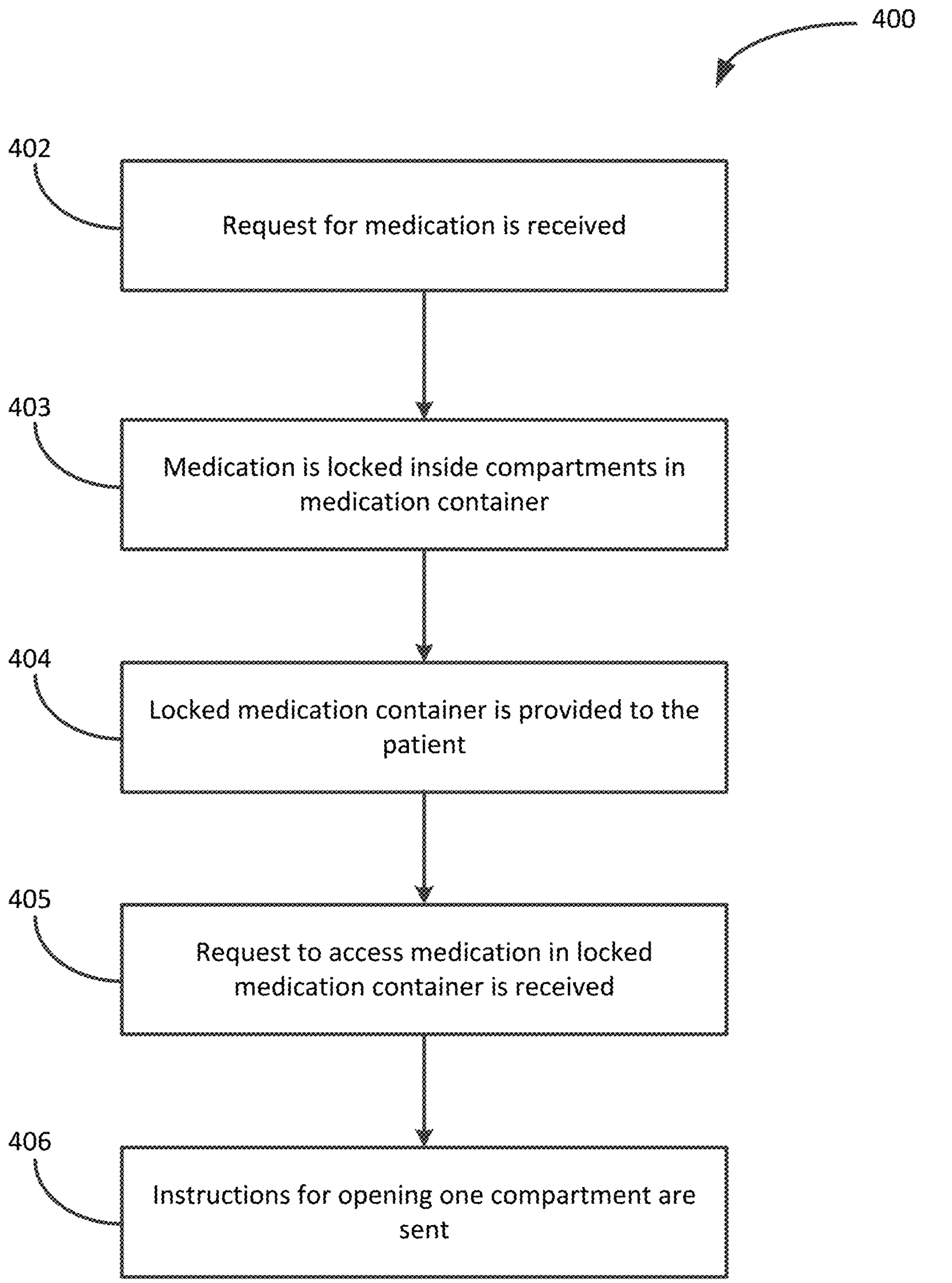
FIG. 4A is an exemplary method for utilizing a medication container according to an embodiment of the present disclosure.

FIG. 4A illustrates a method 400 of distributing medicine utilizing medication container 300. At step 402, a request for medication may be received by a pharmacy or other medication provider. The request may include a name or other identifier of the medication or a prescription for the medication.

At step 403, the pharmacy or other medication provider may place the medication within compartments 306 of medication container 300 and secure compartments 306 via locking mechanism 304. The pharmacy or medication provider may program or set locking mechanism 304 with or more credential or locking mechanism 304 may already be programmed with one or more pre-set credential. In one aspect, locking mechanism 304 may be programmed with a first credential that, when entered into locking mechanism 304, will unlock a first compartment 306 (or a first subset of compartments 306). Locking mechanism 304 may be further programmed with a second credential that, when entered into locking mechanism 304, will unlock a second compartment 306 (or a second subset of compartments 306). The one or more credential may be recorded by the pharmacy or medication provider so that the one or more credentials may later be provided to the patient or caregiver to unlock one or more of compartments 306. A container identifier uniquely identifying medication container 300 may be recorded for later reference by the pharmacy or medication provider.

At step 404, medication container 300, now locked and containing the medication, may be provided to the patient or caregiver, such as the patient or caregiver that originally requested the medication.

At step 405, a request to gain access to the medication within medication container 300 may be received, such as by the pharmacy or other medication provider. The request may be to gain access to the medication within one or a subset of compartments 306 of medication container 300. In one aspect, the request may be to gain access to the medication within antidote compartment 312. The request may include the container identifier, which may be used by the pharmacy or medication provider to determine one or more credentials associated with the particular medication container 300 identified by the container identifier.

At step 406, instructions for opening one or more compartments 306 are provided by the pharmacy or medication provider to the patient or caregiver. The instructions may include one or more credentials each usable to unlock one or more compartments 306 in medication container 300. For example, a first credential may be provided that, when entered into locking mechanism 304, unlocks a first compartment 306 (or antidote compartment 312). Upon receiving the credential, the patient or caregiver may enter the credential into locking mechanism 304 to unlock the corresponding compartment 306 (or antidote compartment 312) and gain access to the medication therein.

In an aspect, a patient may have a prescription for a medicine that should be taken once a day. Some medicines can be highly addictive or are subject to abuse, and thus need to be monitored. In an example, using medication container 300 from FIG. 3, the prescribed daily dosage of the medication is placed inside each compartment 306. Each compartment 306 may be associated with a different date. On the date associated with the particular compartment 306, instructions may be sent for opening that compartment.

The instructions may be sent in a variety of ways. In an aspect, locking mechanism 304 may be a type of combination lock, mechanical or electronic. The credential for unlocking a particular compartment 306 may be given to the person to whom the medicine is prescribed. The person may then put in the credential to unlock the compartment 306 and retrieve the medicine. Each compartment 306 may have a unique credential so that the person can only retrieve the prescribed amount of the medicine at a given time.

Figure 4B:
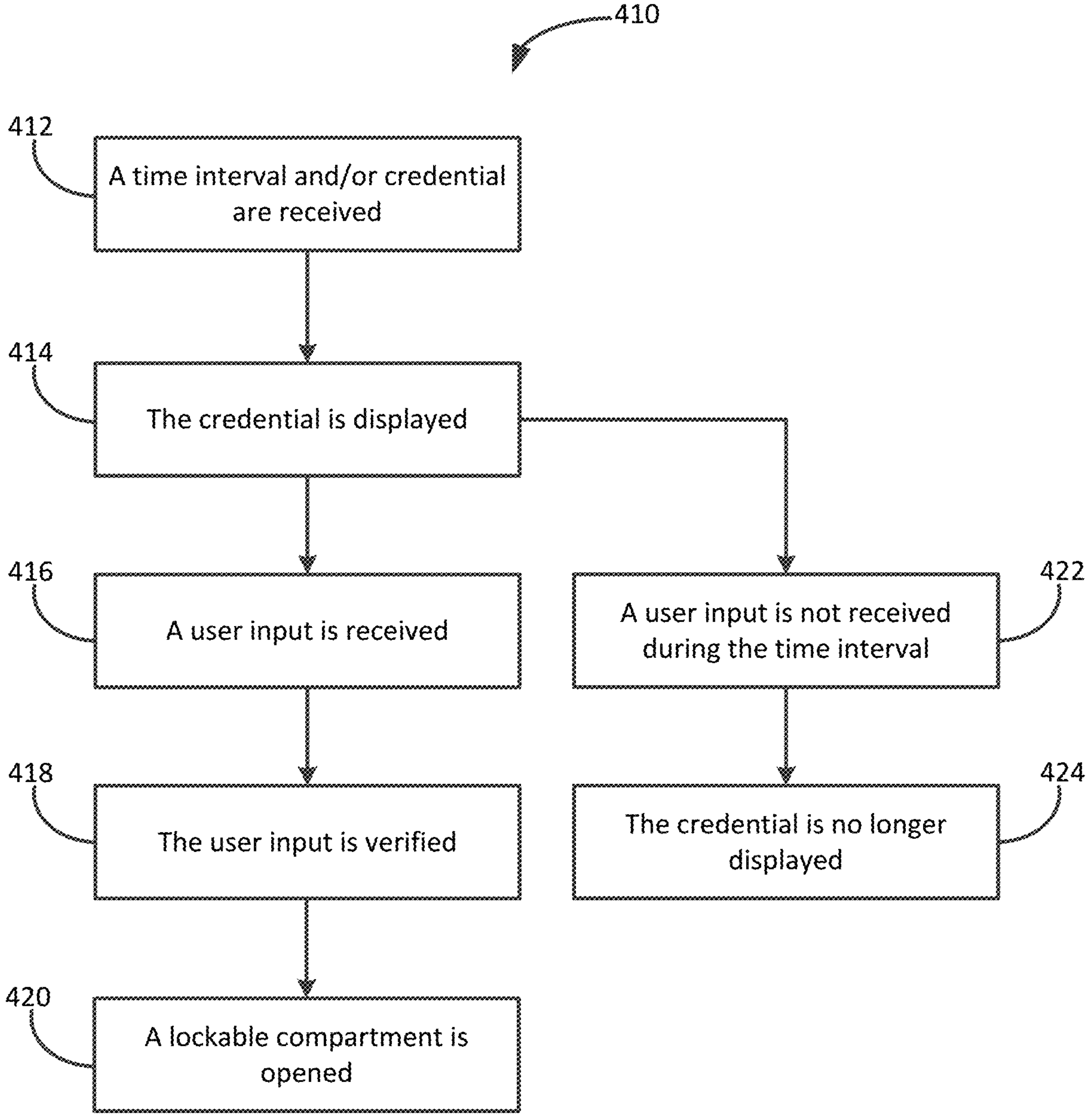
FIG. 4B is a block diagram describing a method for utilizing a medication container according to an embodiment of the present disclosure.

FIG. 4B illustrates a method 410 of distributing medicine utilizing medication container 300. Method 410 may be performed in conjunction with method 200 described in relation to FIG. 2 and/or method 400 described in relation to FIG. 4A. At step 412, a time interval may be received by medication container 300. During the time interval, an associated credential may be usable with locking mechanism 304 to unlock one or more compartments 306. In some aspects, the credential may be received along with the time interval. In other aspects, the credential may already be stored in memory 316 of medication container 300 at the time that the time interval is received. In yet other aspects, processor 314 of medication container 300 may randomly generate the credential (e.g., an alphanumeric code or password), either before or after the timer interval is received. The time interval and/or associated credential may be received before medication container 300 is provided to the patient or caregiver. For instance, the pharmacy or medication provider may program locking mechanism 304 of medication container 300 with the time interval and/or associated credential before delivering medication container 300 to the patient or caregiver. Additionally or alternatively, the time interval and/or credential may be received while medication container 300 is possessed by the patient or caregiver. In such a case, the time interval and/or credential may be provided to medication container 300 via a network from a telecommunication system associated with the pharmacy or medication provider.

At step 414, the credential is displayed. For example, the credential may be displayed on display 310 of medication container 300 during the corresponding time interval. An indication of the time interval may also be displayed on display 310. Displaying the credential and/or time interval may serve as an indicator that the patient or caregiver should enter a credential input during the time interval. Following the credential being displayed, a user may potentially provide a user input (e.g., enter a credential, such as a code, via locking mechanism 304). If a user input is received, then steps 416-420 are followed. At step 416, a user input is received by medication container 300, such as via locking mechanism 304. The user input may preferably be the credential displayed on display 310. At step 418, the user input is verified. For example, medication container 300 may verify that the user input matches the credential displayed or that the user input is otherwise valid. Further, medication container 300 may verify that the user input was entered during the time interval associated with that credential. At step 420, responsive to verifying that the provided credential is correct and/or that it was provided during the time interval, locking mechanism 304 may be deactivated or unlocked to open one or more compartments 306 so that medication within may be accessed. If the provided credential was incorrect and/or not provided during the corresponding time interval, locking mechanism 304 remains locked and the user may not access the medication in compartments 306.

Alternatively, if user input is not received in the time interval, steps 422 and 424 are followed. At step 422, the user input is not received during the time interval. For example, the credential may be displayed on display 310 for the time interval, but the user does not input the credential. In step 424, the credential is no longer displayed. For example, when the time interval expires, the credential may no longer be displayed on display 310, disallowing access to medication in lockable compartments 306. Further, the credential corresponding to and previously displayed during the expired time interval is no longer valid to open compartments 306 of medication container 300 upon expiration of the time interval.

In an alternative embodiment of the method 410 shown in FIG. 4B, a time interval (without an associated credential) is received by medication container 300. The credential may already be stored and known by medication container 300 at the time that the time interval is received. Such an embodiment may be particularly useful when locking mechanism 304 is configured as a biometric lock requiring a biometric identifier as the credential. This embodiment may be useful in such a case due to a biometric identifier credential being generally non-communicable, unlike a code or password. In some aspects, the time interval may be received by medication container 300 before medication container 300 comes into possession of the patient or caregiver. For example, a pharmacy or other medication provider may pre-code one or more time intervals into medication container 300 before providing medication container 300 to the patient or caregiver. In other aspects, the time interval may be received after medication container 300 is possessed by the patient or caregiver. For example, the time interval may be received over a network from a telecommunication system associated with the pharmacy or other medication provider.

Subsequent to receiving the time interval, display 310 of medication container 300 may provide a notification that locking mechanism 304 is active and will unlock one or more compartments 306 upon the input of a valid credential (e.g., a biometric identifier). Display 310 may further indicate the start time, end time, and/or duration of the time interval.

A user input of a credential may be received by locking mechanism 304. If the credential is received (and is valid) within the time interval, locking mechanism 304 may unlock one or more compartments 306 and allow access to the medication therein. If the credential is received outside of the time interval (or is not valid), locking mechanism 304 will not unlock any compartments 306.

Figure 5:
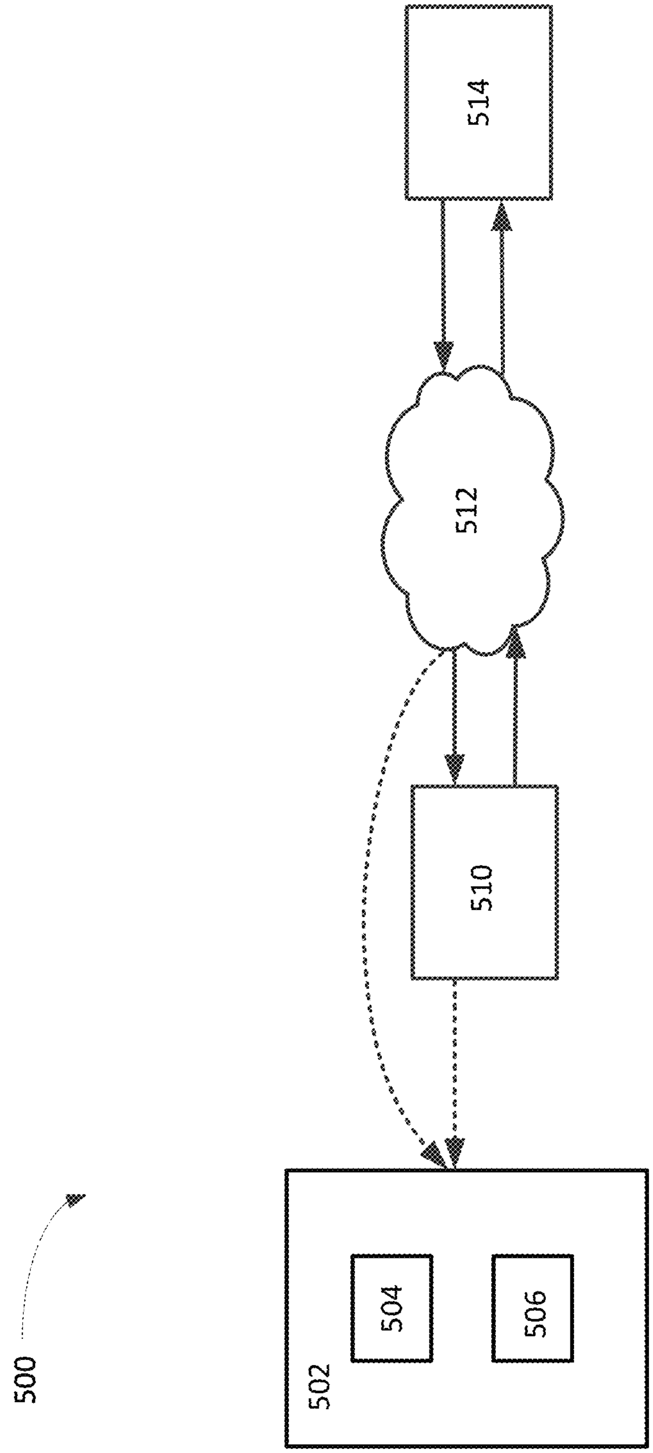
FIG. 5 is an example diagram of a system for dispensing medicine using a medication container according to an embodiment of the present disclosure.

FIG. 5 illustrates a system 500 in which medication container 502 may be used. System 500 may include medication container 502, mobile device 510, network 512, and medication provider interface 514. Medication container 502 may be a medication container as described herein, such as medication container 100 from FIG. 1 or medication container 300 from FIG. 3. Medication container may include locking mechanism 504 and compartment 506.

Mobile device 510 may be a device that can connect to a wireless or wired network, such as network 512. In an aspect, mobile device 510 may also be able to connect to medication container 502. Mobile device 510 may be a mobile phone, smart phone, tablet, or other similar device. Mobile device 510 may connect to medication container 502 via a proximity communication protocol such as Bluetooth® or NFC. Network 512 may be any wired or wireless network, such as the Internet, wherein data can be transmitted to and from different devices. Medication provider interface 514 may be an interface that receives requests for the medication and/or provides the means for the requestor to access medication. In an aspect, medication provider interface 514 may be a server or other similar computing device that may be associated with the pharmacy or physician.

In another aspect, a pharmacist or physician (not shown) may place requested medicine (not shown) in compartment 506 of medication container 502. Medication container 502 may be locked using locking mechanism 504. Medication provider interface 514 may receive verification credentials from the pharmacist or physician for accessing the medication. Verification credentials may be, for example, a spoken password, an alphanumeric password, biometric information, a code, and the like. When the requestor needs the medication, the requestor may connect to medication provider interface 514 using mobile device 510 through network 512. Medication provider interface 514 may require a verification credential before providing instructions for opening medication container 502. The requestor may then provide the verification credential to medication provider interface 514 through mobile device 510. For example, the requestor may call the physician or pharmacist with mobile device 510 and provide a spoken password or answer security questions. In another example, mobile device 510 includes a thumbprint reader or another biometric reader, and the biometric information is transmitted to medication provider interface 514 for verification. In yet another example, the requestor may send a text message with a password to medication provider interface 514 for verification. Still yet another example would be an application running on the mobile device that would process verification data and other pertinent information relating to the medical provider, requestor and medication.

Upon verifying the identity of the requestor and/or the identification of the medication container, medication provider interface 514 may provide approval that medication container 502 may be unlocked. Medication provider interface 514 may provide the means or instructions for opening the medication container. For example, if the requestor provides a spoken password over the phone, medication provider interface 514 may provide the requestor with a credential to unlock locking mechanism 504. In another example, medication provider interface 514 may send a credential to mobile device 510 via text, email, or other electronic means. In another example, medication provider interface 514 may be able to connect to locking mechanism 504 through network 512 to unlock medication container 502. In yet another example, mobile device 510 may connect directly to locking mechanism 504 via a proximity communication protocol such as Bluetooth® or NFC to unlock locking mechanism 504. It can be appreciated that there may be a variety of ways within the scope of this disclosure in which medication provider interface 514 may provide the instructions to unlock medication container 502.

The methods as systems described herein may be at least partially implemented as computer-executable instructions. Such instructions may be stored or distributed on computer-readable media, such a memory, including magnetic and optically readable and removable computer disks, hard-wired or preprogrammed in chips (e.g., EEPROM semiconductor chips or ASICs), as well as distributed electronically over the Internet or over other networks (including wireless networks). Computer readable storage media disclosed herein does not include signals.

Figure 6:
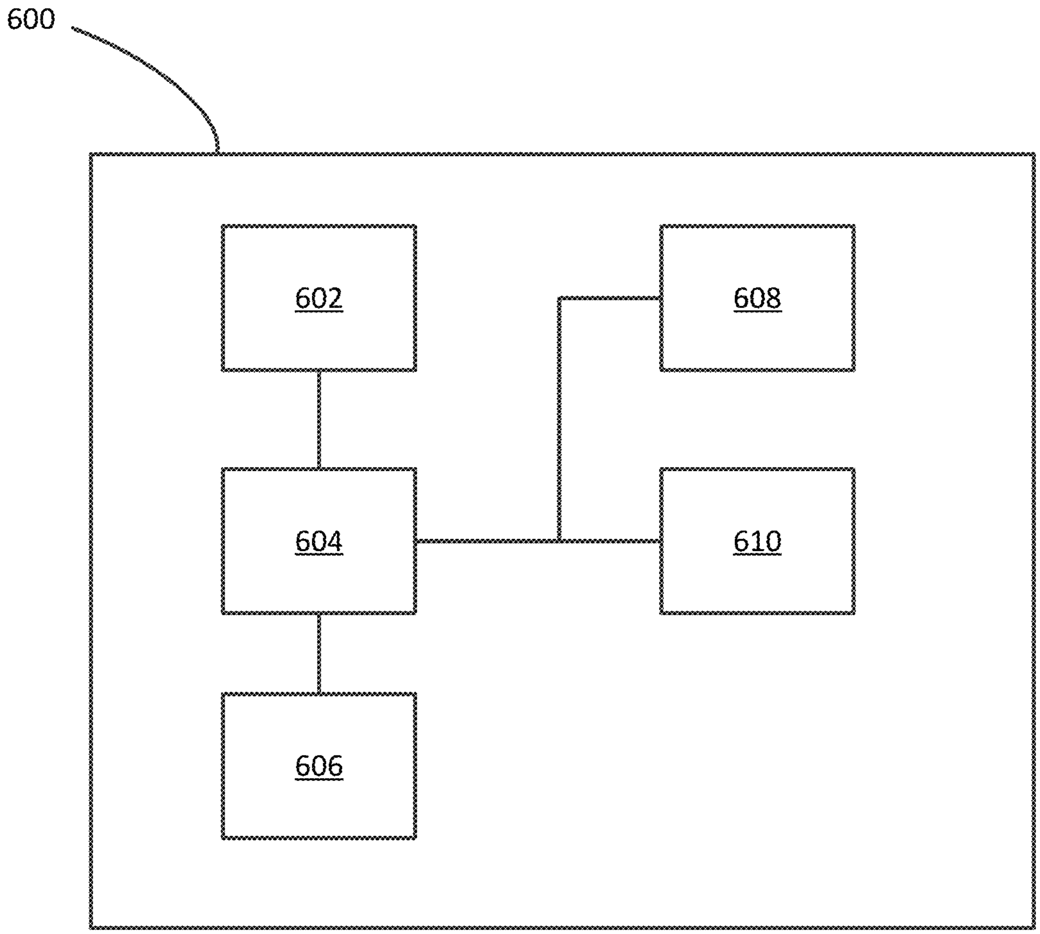
FIG. 6 is a diagram of an example telecommunication system according to an embodiment of the present disclosure.

FIG. 6 depicts a telecommunication system 600 in which the methods and systems described herein may at least partially be implemented. For example, telecommunication system 600 may be incorporated with medication container 100 and/or medication container 300 to facilitate at least some operations disclosed here relating to medication container 100 and/or medication container 300. Telecommunication system 600 may include memory 602, processor 604, transceiver 606, hard drive 608, and power supply 610. Memory 602 may be communicatively coupled to processor 604 and contain instructions for operations for processor 604 to perform. Hard drive 608 and transceiver 606 may be operably coupled to processor 604. Power supply 610 may supply power to processor 604.

Processor 604 may be any type of known processor found in a computing environment that can execute instructions. Memory 602 may be any type of known memory, such as RAM, that can provide instructions for the processor to perform. For example, memory 602 may contain a computer program or code for medication provider interface 514. The computer program or code on memory 602 may provide instructions to processor 604 for executing the operations of medication provider interface 514 as described herein. Hard drive 608 may be any type of known hard drive that can store information, such has a hard disk drive or a solid state hard drive. Transceiver 606 may be any type of known transceiver that can send and receive information wired or wirelessly. For example, transceiver 606 may be an Ethernet port, and Wifi transceiver, and cellular transceiver, and the like. Power supply 610 may be any type of known computing power supply that can supply power to the processor.

According to some examples, a process for a patient to obtain medication from a prescription securing device includes a patient receiving for a prescription for a medication (e.g., a narcotic). For example, the patient may receive a paper, call-in, or electronic prescription from a medical doctor. IN an example, the prescription may be received through or from a website, e.g., rx.com, hosted by a server. In an example, the patient may register for a website or log into a server, e.g., creating a username and password linked to user or patient information (e.g., personal information, insurance information, health information, prescription history, etc.).

In some examples, the pharmacist may manually enter the patient's information into a pharmacy database and, in other examples, some or all of the patient's information may be transferred from the patient's profile or patient database to a pharmacy database (e.g., website, server, cloud-based storage, etc.). The pharmacy database may also store one or more credentials associated with the pharmacist, including pharmacist/pharmacy license numbers, DEA registration numbers, etc.

According to some examples, several different types of disposable or replaceable parts may be available. For example, each type of disposable or replaceable part may be sized or optimized for a particular size or shape (e.g., a range of sizes and shapes) of medications. For examples, a disposable or replaceable part may be specified for or used with medication such as pills having a diameter within a specific range of diameters. Moreover, the medications that are compatible with a specific disposable or replaceable part may be identified based on attributes such an name or National Drug Code (NDC) number. For example, a pharmacist may log into a database and, based on an NDC number associated with a prescribed medication, determine which disposable or replaceable part is compatible with the medication. The database may inform the pharmacist whether that disposable or replaceable part is in stock or whether another disposable or replaceable part may be used as an alternative (e.g., based on the size or shape of the pill or medication).

In some examples, information associated with the patient, subscription, or prescription is transferred to the secured medication container. For example, the pharmacist may transfer patient information (user id, password, etc.), prescription information (e.g., medication name or type, dosage schedule, etc.) to the container via Bluetooth. Moreover, the container may determine a schedule of medication based on the transferred information.

In some examples, the secure prescription container may be assigned a unique identifier. For example, the unique identifier may be used to distinguish a secure prescription container from a group of other secure prescription containers. In some examples, a user or the pharmacist may assign one or more fingerprints of the user to the secure medication container. Moreover, an override such as a keycode or passcode may be assigned to the secure medication container. For example, the override may be used by a patient or pharmacist in the event that the fingerprint scanner is inoperable.

In some examples, a database (e.g., pharmacy database, database associated with the container, etc.) may store information regarding the number of pills prescribed on stored in the secured medication container (e.g., secured or unsecured). Moreover, the database may include information regarding how many unsecured pills are provided by the pharmacist.

In some examples, a test scenario may be performed with a patient or recipient of the secure medication container. For example, a pharmacist may instruct or observe a user or patient as they operate the secure medication container. For example, the user or patient may place or swipe their finger across the fingerprint scanner, the device may match the fingerprint of the user to a stored fingerprint scan (e.g., stored locally on a memory of the secure medication container or on a remote server), and then the user my press a dispense button or otherwise instruct the medication container to dispense a dose of the medication. Moreover, after confirming that the patient has successfully dispensed the medication, the pharmacist may add the dispensed medication to the unsecured pouch or an unsecured medication bottle.

In some examples, two or more secured containers may be linked automatically (e.g., based on a connection to a database, server, cloud system, etc.) or linked manually (e.g., by a doctor or pharmacist). For example, two containers may be assigned to a particular user or patient and may coordinate dispensing of medication based on relative information, including minimizing drug interactions or side effects and maximizing efficacy of the medications. Moreover, one or more medications may not be dispensed or not be dispense within a specific time period based on negative drug interactions (e.g., no simultaneous dispensing opioids and benzodiazepines).

In some examples, the patient may be limited in the number of attempts to receive medication from the secured container, e.g., a particular number of fingerprint scans or override code attempts. In an example, a user may be prompted for an override code after three or more failed fingerprint scans. Moreover, a user may be directed to take the unsecured medication and contact their pharmacist after repeated failed attempts.

In some examples, the user or patient may access a website or download an application to a device (e.g., a laptop, desktop, mobile computing device, etc.). For example, the application may provide directions to the user or patient, such as when to take medication. Moreover, the application may collect information, such as when the patient attempts to receive medication or how often the patient receives the medication. In some examples, the device my poll the user to determine a state of the user (e.g., pain, awareness, etc.). For example, the device may require the user to perform an action (e.g., copying or entering a code) to determine a state of awareness, comprehension, etc. of the user.

In some examples, the user or patient may use the application to access the medication stored in the secured container. For example, a user device running the application may be connected to the secured container via a wired or wireless connection. The application may prompt the user for a passcode or to scan their fingerprint and direct the secured container to dispense the medication based on satisfying the security protocols of the application.

In some examples, the user may receive notifications regarding the medication of the secured container or any linked containers. For example, the user may be notified by the container, an application (e.g., a push notification), website, or database associated with the container, or by email or text message when to one or more medications are ready or appropriate to be dispensed (e.g., based on the prescribed time interval of the medication or to minimize interactions of multiple medications).

In some examples, a physician or pharmacist may receive information from the medication container. For example, the pharmacist or physician may access information stored on a server or obtained directly from the device (e.g., via wired or wireless transmission). For example, a physician may wirelessly receive information from the device when a patient brings the device into the physician's waiting area. Physician or pharmacist information may include data relating to the patient or user's interactions with the device. For example, the pharmacist or doctor may obtain information including frequency, dates, or times that the patient received medication, as well as how the medication was unlocked (e.g., via fingerprint or unlock code). Other information may include the number or amount of medication that has been taken, as well as a number or amount of unused medication (e.g., secured or unsecured).

In some implementations, the data associated with the use by the patient may be analyzed to determine a future prescription plan or patient care plan. For example, analysis of the information (e.g., by a processor of the secured device or a processor connected to a database containing the information) may determine that the user may have sold the bottle based on a low percentage of fingerprint scanner use and a corresponding high percentage of override code use. Moreover, analysis of the information may show that the user does not need to be prescribed the same amount of medication, e.g., based on an identification that the user routinely uses the medication less frequently that prescribed.

In some examples, the data associated with the user by the patient may be analyzed to identify a particular trend associated with the patent's use of the medication. For example, it may be identified that the patient repeatedly requests dispensing of medication prior to the earliest time the medication is available (e.g., based on the prescribed time interval). As another example, it may be determined that the patient is developing a dependency on a medication (e.g., an opioid) if the patient repeatedly requests medication prior to a period of availability (e.g., prematurely based on the prescribed dosage and timing).

In some examples, the data associated with the user may include any deviations from a prescribed prescription plan, e.g., requesting medication more or less frequently than described. Moreover, in some examples, the data associated with the user may include a pattern with respect to the prescribed prescription plan, e.g., medication requested more or less often than prescribed at specific points in the day. Moreover, the data may include data points or trending associated with use of any unsecured medication. For example, a pattern of depleting all available unsecured pain medication may be indicative of a possible dependency on the pain medication.

In some examples, the secure medication container may include a GPS location or tracking device. For example, the information seen by a doctor or pharmacist may include a GPS location of the user at the time. Moreover, in some examples, a user may be informed (e.g., via email, text message, push notification, etc.) to take a medication based on a location of the user. For example, certain medications such as pain killers may be preferable to take at a user's home address.

Figure 7:
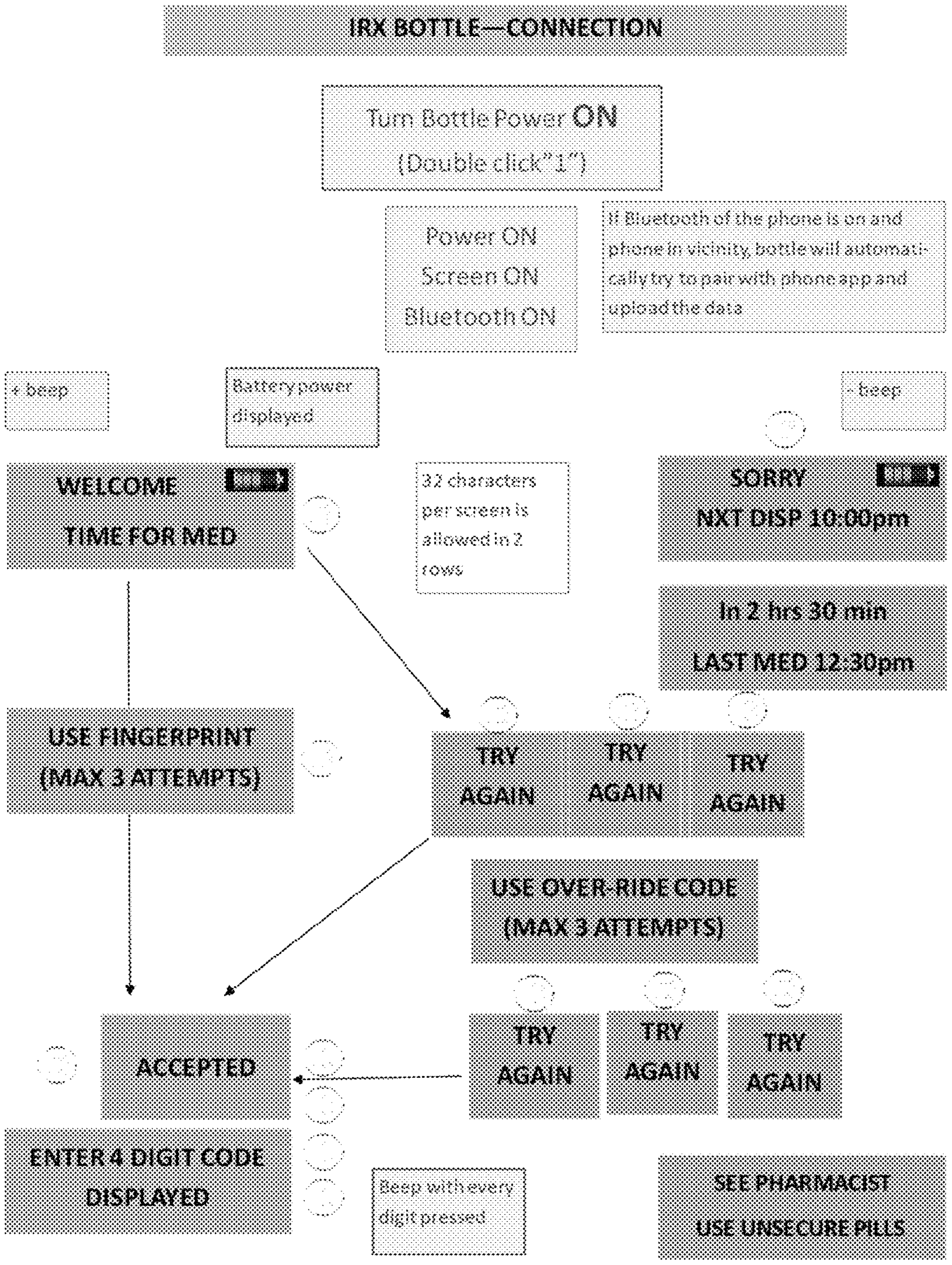
FIG. 7 is a block diagram illustrating logic employed by a medication container according to an embodiment of the present disclosure.

As shown in FIG. 7, an illustrative medication container may be turned on (e.g., by double clicking an alphanumeric input). For example, when the medication container is turned on, the screen may also turn on. Moreover, the medication container may automatically attempt to pair with a user's phone or computing device (e.g., via Bluetooth or other wireless connection). The medication container may communicate with the user via text on the screen, audible beeps, etc. For example, the medication container may inform the user when an incorrect fingerprint has been entered or may prompt the user for an override code. If the user is unable to operate the medication container (e.g., failed fingerprint scans or failed override code attempts), the medication container may prompt the user to contact a pharmacist and use unsecured pills in the meantime.

Figure 8:
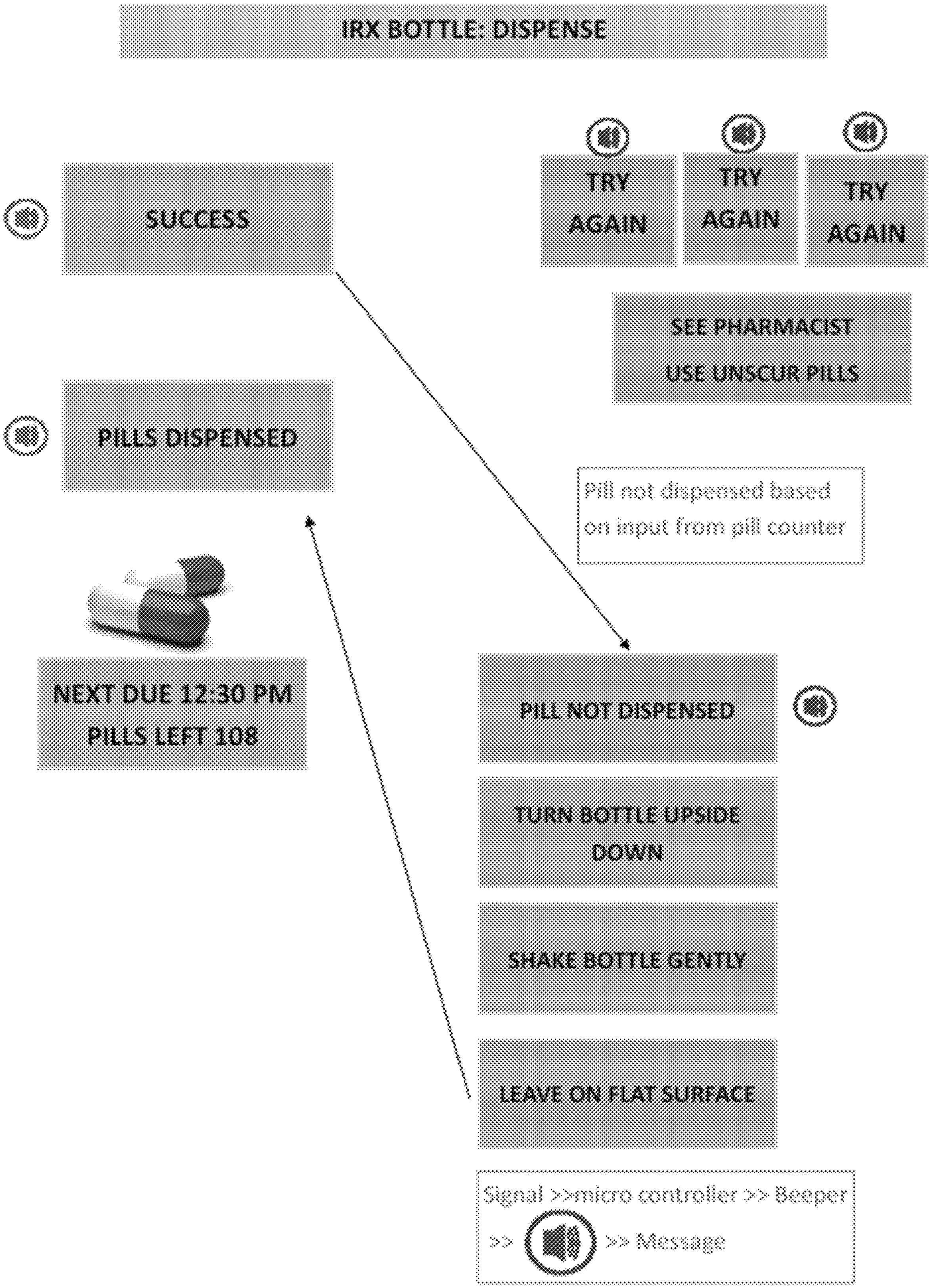
FIG. 8 is a block diagram illustrating logic employed by a medication container according to an embodiment of the present disclosure.

As shown in FIG. 8, the medication container may determine whether medication has been successfully dispensed and, if not, the medication container may provide the user with one or more troubleshooting prompts. For example, the medication container may inform the user via on-screen messages or audible beeps/indicators that the medication has not been dispensed. Moreover, the medication container may direct the user to perform one or more troubleshooting actions (e.g., turn bottle upside down, shake bottle gently, leave on flat surface, etc.).

While the disclosure has been described in connection with the various embodiments of the various figures, it is to be understood that other similar embodiments can be used, or modifications and additions can be made to the described embodiments. For example, the examples of the disclosure have centered around travel medication. The disclosure would be equally applicable if the medical container was not portable and thus the material of the medical container being more substantial in size and strength to prevent breakage. For example, the medical container may be in a kiosk at a camp or conference center wherein certain medications would be preloaded into the medical container and the systems and methods of the disclosure used to provide access to the medication inside the medical container. Therefore, the travel packaging for medications as described herein should not be limited to any single embodiment, but rather should be construed in breadth and scope in accordance with the appended claims.

The invention claimed is:

1. A medication container comprising:

a cone extending upward from a bottom of the medication container and wherein the cone has a non-infinite sloped surface, wherein the medication container includes an indicator of a medication; and a turntable having an opening defined therein, wherein the turntable is rotatably connected to the cone wherein the opening rotates along with the turntable and wherein a size parameter of the opening is selected based on one or more dimensions of the medication;

a destruction mechanism configured to destroy the medication if there is a security breach of the medication container; and a continuous wire disposed along a surface of the medication container and a sensor configured to detect a break of the continuous wire, and wherein the destruction mechanism is in communication with the medication container and wherein the destruction mechanism is activated upon a detected break of the continuous wire.

2. The medication container of claim 1, further comprising one or more actuators triggered by a break of the continuous wire.

3. The medication container of claim 2, further comprising a chemical storage vessel, wherein the one or more actuators cause a chemical from the chemical storage vessel to be expelled into the medication container.

4. The medication container of claim 3, wherein the chemical storage vessel is a syringe and a plunger of the syringe is under spring tension and locked in a position prior to the break of the continuous wire.

5. The medication container of claim 4, wherein the plunger is unlocked based on the break of the continuous wire.

6. The medication container of claim 3, wherein the chemical storage vessel contains a chemical selected from the group consisting of cyanoacrylate, isocyanate, polyurethane, alkaline compounds, acidic compounds, epoxy, accelerator agents, foaming agents, and bittering substances, and coloring agents.

7. The medication container of claim 3, wherein the chemical storage vessel contains denatonium.

8. The medication container of claim 1 wherein the continuous wire carries a signal therethrough when the medication container has not experienced the security breach and the continuous wire does not carry a signal after the medication container has experienced the security breach.

9. A method comprising:

receiving a signal from a sensor coupled to a continuous wire disposed along a surface of a medication container, wherein the medication container comprises a cone extending upward from a bottom of the medication container and wherein the cone has a non-infinite sloped surface, wherein the medication container includes an indicator of a medication; and a turntable having an opening defined therein, wherein the turntable is rotatably connected to the cone wherein the opening rotates along with the turntable and wherein a size parameter of the opening is selected based on one or more dimensions of the medication; and detecting, based on the received signal, a break of the continuous wire.

10. The method of claim 9 wherein the continuous wire transmits an active signal to the sensor when the medication container has not experienced a security breach and the detecting step detects that the active signal is no longer transmitted after the medication container experiences the security breach.

11. The method of claim 9, further comprising activating a destruction mechanism in response to the detected break of the continuous wire wherein the destruction mechanism destroys the medication.

12. The method of claim 9, further comprising triggering one or more actuators in response to the break of the continuous wire.

13. The method of claim 12, further comprising expelling a chemical from a chemical storage vessel into the container.

14. The method of claim 13, wherein the chemical storage vessel contains a chemical selected from the group consisting of cyanoacrylate, isocyanate, polyurethane, alkaline compounds, acidic compounds, epoxy, accelerator agents, foaming agents, and bittering substances, and coloring agents.

15. The container of claim 13, wherein the chemical storage vessel contains denatonium.

16. A method comprising:

establishing a threshold for a number of attempts to access a medication container, wherein the container comprises a cone extending upward from a bottom of the medication container and wherein the cone has a non-infinite sloped surface, wherein the medication container includes an indicator of a medication and a turntable having an opening defined therein, wherein the turntable is rotatably connected to the cone wherein the opening rotates along with the turntable and wherein a size parameter of the opening is selected based on one or more dimensions of the medication;

detecting a plurality of failed attempts to access the medication container, wherein the plurality exceeds the threshold;

triggering a destruction mechanism based on the detecting step, wherein the destruction mechanism renders the medication unusable.

* * * * *